United States Patent
Vrzic et al.

(10) Patent No.: US 10,075,907 B2
(45) Date of Patent: Sep. 11, 2018

(54) SYSTEM AND METHOD FOR VIRTUALIZED FUNCTIONS IN CONTROL AND DATA PLANES

(71) Applicants: Sophie Vrzic, Kanata (CA); Hang Zhang, Nepean (CA); Nimal Gamini Senarath, Ottawa (CA)

(72) Inventors: Sophie Vrzic, Kanata (CA); Hang Zhang, Nepean (CA); Nimal Gamini Senarath, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/169,383

(22) Filed: May 31, 2016

(65) Prior Publication Data
US 2016/0353465 A1    Dec. 1, 2016

Related U.S. Application Data

(60) Provisional application No. 62/169,243, filed on Jun. 1, 2015, provisional application No. 62/220,564, filed on Sep. 18, 2015.

(51) Int. Cl.
*H04W 48/18* (2009.01)
*H04W 16/10* (2009.01)
(Continued)

(52) U.S. Cl.
CPC .............. *H04W 48/18* (2013.01); *H04W 8/02* (2013.01); *H04W 12/06* (2013.01); *H04W 16/10* (2013.01);
(Continued)

(58) Field of Classification Search
CPC ..... H04W 48/18; H04W 16/10; H04W 12/06; H04W 76/021; H04W 72/12;
(Continued)

(56) References Cited

U.S. PATENT DOCUMENTS

| 7,925,756 B1 | 4/2011 | Riddle |
| 9,392,471 B1 | 7/2016 | Thomas et al. |

(Continued)

FOREIGN PATENT DOCUMENTS

| CN | 102710508 | 10/2012 |
| CN | 103052054 | 4/2013 |

(Continued)

OTHER PUBLICATIONS

International Search Report dated Aug. 12, 2016 for International Patent Application No. PCT/CN2016/084398.
(Continued)

*Primary Examiner* — Nam Huynh

(57) ABSTRACT

Methods and apparatus for management of network slices in a communication network such as a $5^{th}$ generation wireless communication network are provided. Management planes may be provided which are separate from the plurality of network slices. A connection manager residing in a management plane receives an indication that a mobile device is to be associated with the communication network. The connection manager may reside at an access node or in the core network. A network slice is determined, and the connection manager transmits instructions, to one or more network nodes, to associate the mobile device with the network slice. The instructions may be provided to a local connection manager. The slice may be requested explicitly by the mobile device, or determined based on device and/or network requirements.

22 Claims, 27 Drawing Sheets

(51) Int. Cl.
| | |
|---|---|
| *H04W 12/06* | (2009.01) |
| *H04W 72/12* | (2009.01) |
| *H04W 72/04* | (2009.01) |
| *H04W 28/02* | (2009.01) |
| *H04W 24/10* | (2009.01) |
| *H04W 8/02* | (2009.01) |
| *H04L 12/46* | (2006.01) |
| *H04W 16/28* | (2009.01) |
| *H04W 84/00* | (2009.01) |

(52) U.S. Cl.
CPC ....... *H04W 24/10* (2013.01); *H04W 28/0221* (2013.01); *H04W 28/0247* (2013.01); *H04W 72/0433* (2013.01); *H04W 72/12* (2013.01); *H04L 12/4641* (2013.01); *H04W 16/28* (2013.01); *H04W 84/00* (2013.01)

(58) Field of Classification Search
CPC ......... H04W 72/0433; H04W 28/0221; H04W 8/02; H04W 28/0247; H04W 24/10; H04W 84/00; H04W 16/28; H04W 4/70; H04W 76/11; H04W 72/048; H04L 47/2408; H04L 41/5022; H04L 47/14; H04L 47/2441; H04L 47/2425
See application file for complete search history.

(56) References Cited

U.S. PATENT DOCUMENTS

| | | | |
|---|---|---|---|
| 2003/0103510 | A1 | 6/2003 | Svanberg et al. |
| 2003/0117954 | A1 | 6/2003 | De Neve et al. |
| 2003/0177221 | A1 | 9/2003 | Ould-Brahim et al. |
| 2008/0130519 | A1 | 6/2008 | Bahl et al. |
| 2009/0191888 | A1 | 7/2009 | Abedi et al. |
| 2011/0283017 | A1 | 11/2011 | Alkhatib et al. |
| 2012/0120887 | A1 | 5/2012 | Deaton et al. |
| 2013/0007232 | A1 | 1/2013 | Wang et al. |
| 2013/0143574 | A1 | 6/2013 | Teyeb et al. |
| 2013/0212285 | A1 | 8/2013 | Hoffman et al. |
| 2013/0225123 | A1 | 8/2013 | Adjakple et al. |
| 2014/0086177 | A1 | 3/2014 | Adjakple et al. |
| 2014/0086194 | A1 | 3/2014 | Sugahara et al. |
| 2014/0269295 | A1 | 9/2014 | Anumala et al. |
| 2014/0282769 | A1 | 9/2014 | Salem et al. |
| 2014/0301192 | A1 | 10/2014 | Lee et al. |
| 2014/0317261 | A1 | 10/2014 | Shatzkamer et al. |
| 2014/0376555 | A1 | 12/2014 | Choi et al. |
| 2015/0043382 | A1 | 2/2015 | Arora et al. |
| 2015/0063112 | A1 | 3/2015 | Wu et al. |
| 2015/0154258 | A1 | 6/2015 | Xiong et al. |
| 2015/0341907 | A1 | 11/2015 | Zhang et al. |
| 2016/0352528 | A1 | 12/2016 | Law et al. |
| 2017/0079059 | A1 | 3/2017 | Li et al. |
| 2017/0104609 | A1 | 4/2017 | McNamee et al. |
| 2017/0126492 | A1 | 5/2017 | Law et al. |
| 2017/0127427 | A1 | 5/2017 | Claridge et al. |
| 2017/0208019 | A1* | 7/2017 | Shimojou ........... H04L 12/4641 |
| 2017/0257870 | A1 | 9/2017 | Farmanbar |

FOREIGN PATENT DOCUMENTS

| | | |
|---|---|---|
| CN | 10354837 A | 1/2014 |
| CN | 104243301 A | 12/2014 |
| CN | 104270441 | 1/2015 |
| EP | 1729532 A1 | 12/2006 |
| EP | 2493235 A1 | 8/2012 |
| EP | 2627140 A1 | 8/2013 |
| EP | 2667541 A1 | 11/2013 |
| EP | 2866495 A2 | 4/2015 |
| GB | 2512900 A | 10/2014 |
| WO | 2009071431 A1 | 6/2009 |
| WO | 2011032595 A1 | 3/2011 |
| WO | 2011086250 | 7/2011 |
| WO | 2011144538 | 11/2011 |
| WO | 2013093462 A1 | 6/2013 |
| WO | 2014086978 A1 | 6/2014 |
| WO | 2014117135 A2 | 7/2014 |
| WO | 2014121471 | 8/2014 |
| WO | 2014160228 A1 | 10/2014 |
| WO | 2014180513 A1 | 11/2014 |
| WO | 2015031512 A1 | 3/2015 |
| WO | 2015057960 A1 | 4/2015 |

OTHER PUBLICATIONS

International Search Report dated Aug. 23, 2016 for International Patent Application No. PCT/CN2016/084396.
International Search Report dated Nov. 30, 2016 for International Patent Application No. PCT/CN2016/099726.
English Abstract of CN 103052054.
Partial English Translation of CN 102710508.
English translation of CN 104270441.
English Abstract of CN 102710508.
English translation of description and claims of WO2011086250 (machine translation).
3GPP TR 22.891 entitled "Study on New Services and Markets Technology Enablers," Release 14, Version 1.2.0, Jan. 20, 2016.
ETSI GS NFV 001 entitled "network function virtualization (NFV); Use Cases", Oct. 2013.
ETSI GS NFV 002 entitled "network function virtualization (NFV); Architectural Framework", Oct. 2013.
3Gpp Technical Specification Group Services and System Aspects; TR 23.707, "Architecture Enhancements for Dedicated Core Networks; Stage 2," V. 13.0.0, Feb. 17, 2014.
International Search Report and Written Opinion for PCT/CN2016/084399, filed Jun. 1, 2016, dated Aug. 26, 2016.
International Search Report and Written Opinion for PCT/CN2016/084401, filed Jun. 1, 2016, dated Aug. 24, 2016.
International Search Report and Written Opinion for PCT/CN2016/084405, filed Jun. 1, 2016, dated Aug. 11, 2016.
NGMN Alliance; NGMN 5G White Paper Version 1.0, Feb. 17, 2015.
U.S. Appl. No. 15/169,444, filed May 31, 2016, not yet published.
U.S. Appl. No. 15/168,411, filed May 31, 2016, not yet published.
3GPP TR 22.891 V0.1.0 (Apr. 2015),3rd Generation Partnership Project;Technical Specification Group Services and System Aspects; Feasibility Study on New Services and Markets Technology Enablers;Stage 1 (Release 14), total 26 pages.
European Search Report dated Nov. 22, 2017 for corresponding European Application No. 16802559.1 filed Jun. 1, 2016.
Hamid Farmanbar et al.,"Traffic Engineering for Software-Defined Radio Access Networks", 2014 IEEE Network Operations and Management Symposium, May 5, 2014.
Extended European Search Report dated Feb. 27, 2018 for corresponding European Application No. 16802562.5 filed Jan. 6, 2016.
Extended European Search Report dated Mar. 27, 2018 for corresponding European Application No. 16802556.7 filed Jun. 1, 2016.
Extended European Search Report dated Mar. 1, 2018 for corresponding European Patent Application No. 6802560.9 filed Jun. 1, 2016.
Partial Supplementary European Search Report dated Apr. 19, 2018 for corresponding European Application No. 16802558.3 filed Jun. 1, 2016.
Liang et al., "Wireless Virtualization for Next Generation Mobile Cellular Networks", IEEE Wireless Communications, pp. 61-69, Feb. 1, 2015.
Liang et al., "Wireless Network Virtualization: A Survey, Some Research Issues and Challenges", IEEE Communications Surveys & Tutorials, vol. 17(1), Jan. 1, 2015.

* cited by examiner

SYSTEM AND METHOD FOR VIRTUALIZED FUNCTIONS IN CONTROL AND DATA PLANES

CROSS-REFERENCE TO RELATED APPLICATIONS

This application claims priority to U.S. Application No. 62/169,243, filed Jun. 1, 2015, U.S. 62/220,564, filed Sep. 18, 2015, and U.S. 62/220,643, filed Sep. 18, 2015. The content of the above applications are incorporated by reference in their entirety.

FIELD OF THE INVENTION

The present invention pertains to the field of communication networks and in particular to a system and method for providing virtualized functions in control and data planes, and for operating a communication network having network slices.

BACKGROUND

Using technologies, such as Network Function Virtualization (NFV), Network Slicing and Software Defined Networking (SDN), communications networks can be managed so that different subnetworks can be created, each of which is tailored to address demands from different customers. Network slicing allows an underlying resource pool to be segmented into private networks which are isolated from each other in terms of traffic and resource usage. The underlying resources, including connectivity resources and processing and storage resources, can be partitioned amongst a number of different networks. By allowing for traffic and resource isolation between networks, the slices can be sufficiently isolated that, to any entity within a slice, the slice itself is a complete network. By using NFV and other virtualization techniques, network functions can be placed throughout the network, and logical connections between the virtual entities can be defined. Changing or modifying the resources allocated to network functions or links between functions can be done dynamically to allow for a dynamic topology to suit the needs of the network. These flexible network architectures are of interest in mobile networks, both in the core and possibly in the Radio Access Network, and are being studied as candidates for use in next generation mobile networks, such as so-called fifth generation (5G) networks. However, managing variable and competing demands on a potentially large network scale is a complex proposition requiring an effective architecture and management thereof.

Therefore there is a need for a system and method for operating a communication network having network slices, that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a system and method for providing virtualized functions in control and data planes, and for operating a communication network having network slices. In accordance with embodiments of the present invention, there is provided a method, in a communication network supporting a plurality of network slices, for association of a mobile device to the network in general and to an appropriate network slice in particular. The method includes receiving, by a connection manager, an indication that the mobile device is to be associated with the communication network. The connection manager is instantiated in a management plane separately from the plurality of network slices. The method further includes transmitting instructions, from the connection manager to at least one node of the communication network. The instructions direct the at least one node to associate the mobile device with a particular network slice. The particular network slice may be determined, out of the plurality of network slices, by the connection manager.

In accordance with embodiments of the present invention, there is provided a connection manager apparatus in a communication network supporting a plurality of network slices. The apparatus may include a microprocessor or other data processing electronics operatively coupled to a network interface. The apparatus is instantiated as a component in a management plane which is separate from the plurality of network slices. The apparatus is configured to receive, using the network interface, an indication that the mobile device is to be associated with the communication network. The apparatus is further configured to transmit instructions to associate the mobile device with one of the plurality of network slices. The instructions are transmitted via the network interface to at least one node of the communication network. The particular network slice may be determined, out of the plurality of network slices, by the connection manager, for example using the microprocessor or other data processing electronics.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
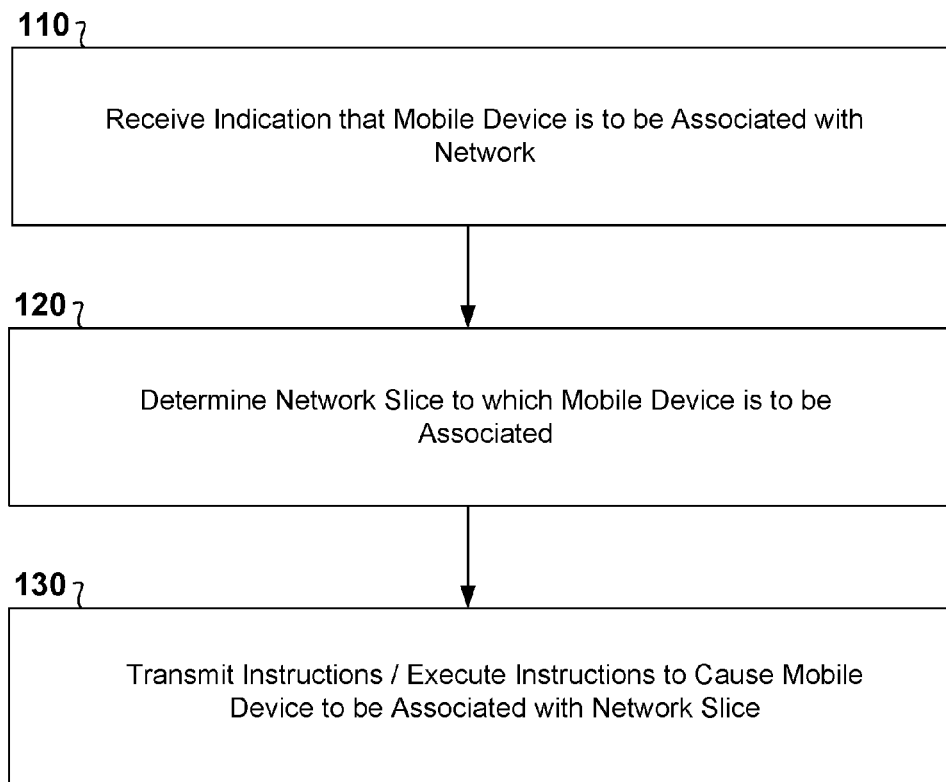
FIG. 1 illustrates operations according to a method and apparatus for providing network connection management, in accordance with embodiments of the present invention.

As used herein, a "network" or "communication network" may service various devices including but not necessarily limited to mobile devices. Such a network may include a radio access portion and backhaul portion. The network may further comprise various virtualized components as will become readily apparent herein. A primary example of such a network is a $5^{th}$ generation mobile network, for example as defined by the Next Generation Mobile Networks Alliance, which is reconfigurable and capable of operating according to network slicing, as described below.

Network operations can be categorized into management plane, control plane and data plane operations. The control plane performs operations such as network device configuration, while the data plane handles data packets by the network devices as configured via the control plane. The management plane may be considered to be part of the control plane, and is usable for example for network administration and to manage configuration of the control plane, for example by enabling operators to interact with the network.

As used herein, the term "User Equipment" (UE) is used for purposes of clarity. However, the UE may refer to one of a variety of devices, such as mobile devices, stationary or mobile machine-type devices, or the like, which communicate with an access node via wireless communication. One skilled in the art will appreciate that a mobile device is a device designed to connect to a mobile network. This connection typically makes use of a wireless connection to an access node. Although the mobile network is designed to support mobility, it is not necessary that the mobile device itself be mobile. Some mobile devices, such as metering devices (e.g. smart meters) may not be capable of mobility, but still make use of the mobile network.

Network slicing refers to a technique for separating different types of network traffic which can be used in reconfigurable network architectures, such as networks employing network function virtualization (NFV). A network slice (as defined in 3GPP TR 22.891 entitled "Study on New Services and Markets Technology Enablers," Release 14, Version 1.2.0, Jan. 20, 2016), is composed of a collection of logical network functions that supports the communication service requirements of particular use cases. One use of network slicing is in the core network. Through the use of network slicing, different service providers can have distinct core networks that run on the same physical set of network and computing resources. This can also be used to create a virtual network dedicated to particular types of network traffic. It should be understood that this discussion is not intended to exclude the application of network slicing as it applies to the radio access edge of the Radio Access Network (RAN), which may need specific functionality to support multiple network slices or partitioning of resources for different network slices. In order to provide performance guarantees, the network slices can be isolated from each other so that one slice does not negatively affect the other slices. The isolation is not restricted to different types of services, but also allows the operator to deploy multiple instances of the same network partition.

In contrast with having all mobile devices connect with the network through a mobility management Entity (MME) determined by a network infrastructure component (e.g. base station, access point, eNB), network slicing allows the instantiation of separate network slices respectively directed toward different network services. This allows for separation of different types of traffic, the different types of traffic potentially having different packet processing requirements and QoS requirements. Network slicing may correspond to the allocation of pooled resources to offer different services to different customers or groups of customers, such that different services are supported by different customized virtual networks, where the different customized virtual networks are substantially separate from one another from the customer's point of view. The pooled resources may be commercial-off-the-shelf hardware components capable of configuration through virtualization approaches, such as NFV, in order to support various network functionalities for supporting the operations of the network slices.

According to embodiments of the present invention, the communication network architecture is based on the use of virtualized network elements and links. This can be realised through the use of a network function virtualization (NFV) framework, along with software defined resource allocation. The NFV framework can be used to define a plurality of virtual network functions (VNFs), each of which can correspond to a function enabling operation of a communication network. For example a VNF can provide the functions of a router, switch, gateway, firewall, load balancer, server and the like. The function is virtualized in the sense that although it is instantiated upon physical resources, the function purely resides within the network. In a virtualized domain, there is reduced or no need for certain physical nodes, such as gateways. Rather, a computing platform can be employed to instantiate the function of the physical nodes, such as virtual gateway functions. These functions use virtual resources, such as computing, storage and networking resources. This provides an alternative to utilizing dedicated hardware resources. To other entities in the network, the virtualized entity appears indistinguishable from a real entity. As such, VNFs may be instantiated on an as-needed basis using available resources, both real and virtual. NFV and virtual network functions architecture is described in ETSI GS NFV 001 entitled "network function virtualization (NFV); Use Cases", October 2013 and ETSI GS NFV 002 entitled "network function virtualization (NFV); Architectural Framework", October 2013, for example.

A NFV management and orchestration (MANO) entity may be used to instantiate the necessary functional network components to ensure that the services identified by a network service (NS) request can be served. The instantiation of a network function (to handle a network service request) can be described by a virtual network function forwarding graph (VNFFG) which defines the set of network functions that are required to provide the requested service. The VNFFG contains a network forwarding path (NFP) that defines a sequence of actions that are to be performed, for example by a collection of VNFs, to provide the requested service.

To provide context to aid in the understanding of network slicing, and the concept of a network slice, it is helpful to understand that in heterogeneous networks in addition to a plurality of different types of nodes covering different locations, different infrastructure providers may own different parts of what is considered as an access network (or even parts of a core network). A Telecommunications Service Provider (TCSP), also referred to as a network operator (NO) or service provider (SP), provides network services to Virtual Network Operators (VNOs). Some examples of these VNOs include an M2M Service Provider (M2M SP), a Mobile Virtual Network Operator (MVNO) or another virtual service provider. These VNOs obtain network services, in the form of a network having virtual functions and connections to allow the VNO to provide service to customers. The TCSP can create the required virtual network as a network slice from its pool of network resources. The M2M SP has a VN composed of nodes and links, which are typically arranged to form a topology having characteristics specified by the M2M SP. However, the VN resources (both nodes and links) need to be mapped to physical infrastructure. The VN may only use a subset of the physical nodes, and each physical node that the VN uses may not be fully used by that VN. It should also be understood that the M2M SP may make use of more than one TCSP, allowing it to create a network slice spanning across different networks, effectively having a network slice that is a superset of the resources of a single TCSP (or as the case may be, a network slice composed of the combination of subsets of the resources of a plurality of TCSPs). If certain bandwidth requirements are set for each logical link, then percentages of physical links are allocated to create the virtual link. This may also include aggregating physical links to create a logical link that may have a greater capacity than a single physical link. Network slices are the collection of the allocation of the resources in what may be different networks. A network slice, from the perspective of an infrastructure provider may only include resources in the infrastructure provider network. From the perspective of the M2M SP, the network slice is a substantially seamless aggregation of all network slices that the M2M SP uses which is analogous to the VN. The TCSP deals with seamlessly connecting the different network slices of infrastructure provider resources, along with network slices from the TCSP resources, to create the M2M VN. It should be understood that at various points in time, the total allocation of network slices for different resources may not add up to 100%. If the value is less than 100% it means that the resource is not fully utilized. If it exceeds 100% it may be a network design choice knowing that there is a very low likelihood that all customers will be using a resource at the same time. It should be understood that the size and nature of different network slices can vary with time as new resources come online or as existing resources are re-allocated. The M2M SP may typically be unaware of the changes in the infrastructure.

A portion of communication network resources may be allocated for use by a network slice. These resources can include radio access communication resources, node-to-node communication resources, computational resources, and memory resources. Resources may further include network infrastructure resources such as management plane resources, control plane resources, and data plane resources. Resources may include hardware resources, such as portions of computer processing capabilities, or communication resources, such as portions of communication links partitioned by time, frequency, spreading code, or a combination thereof. Nodes in the same network slice may be connected by logical connections, much as physical nodes in a physical network are connected by physical connections.

Network Slice Association

Embodiments of the present invention provide for network slice association in a communication network, for associating a mobile device (UE) with one of several network slices supported by the communication network. A connection manager is configured to determine an association between the UE and one of the network slices. The connection manager may be located in a management plane separate from the several network slices, such as in a connection management plane. The connection manager may be instantiated using one or more NFV-enabled nodes in the network, or more generally using computing devices in the network. In some embodiments, the connection manager is instantiated at one or more locations corresponding to an edge of the network. The connection manager may be referred to as a global connection manager to distinguish it from service-specific local connection managers. The global connection manager is used to make the association with the network slice, while the service-specific local connection managers each correspond to a specific network slice and handle connection operations for that network slice.

Network slice association includes handling, by at least the connection manager, a connection request or network attachment request by a mobile device. Having reference to FIG. 1, the operations of the connection manager include receiving 110 an indication that the mobile device is to be associated with the communication network. The indication may be an attach request transmitted by the mobile device, which is transmitted directly or indirectly from the mobile device to the connection manager. The operations may further include determining 120 a network slice, out of the plurality of network slices, to which the mobile device is to be associated. The operations further include transmitting 130 instructions to at least one node of the communication network and/or executing said instructions at least partially by the connection manager. The instructions, when carried out, cause the mobile device to be associated with the network slice.

In some embodiments, the connection manager is instantiated in a management plane, for example in a set of global functions residing in a core of the communication network. In some embodiments, the connection manager is instantiated at one or more locations corresponding to an edge of the network, such as an access node to which the mobile device communicates. In some embodiments, the connection manager may be instantiated at multiple locations, such as multiple access nodes. A distributed connection manager may be used to handle connection requests received through multiple access nodes. The connection manager may be referred to as a global connection manager such as a global connection and mobility manager (G-CMM). The connection manager may also be referred to as a connection management function.

Figure 2A:
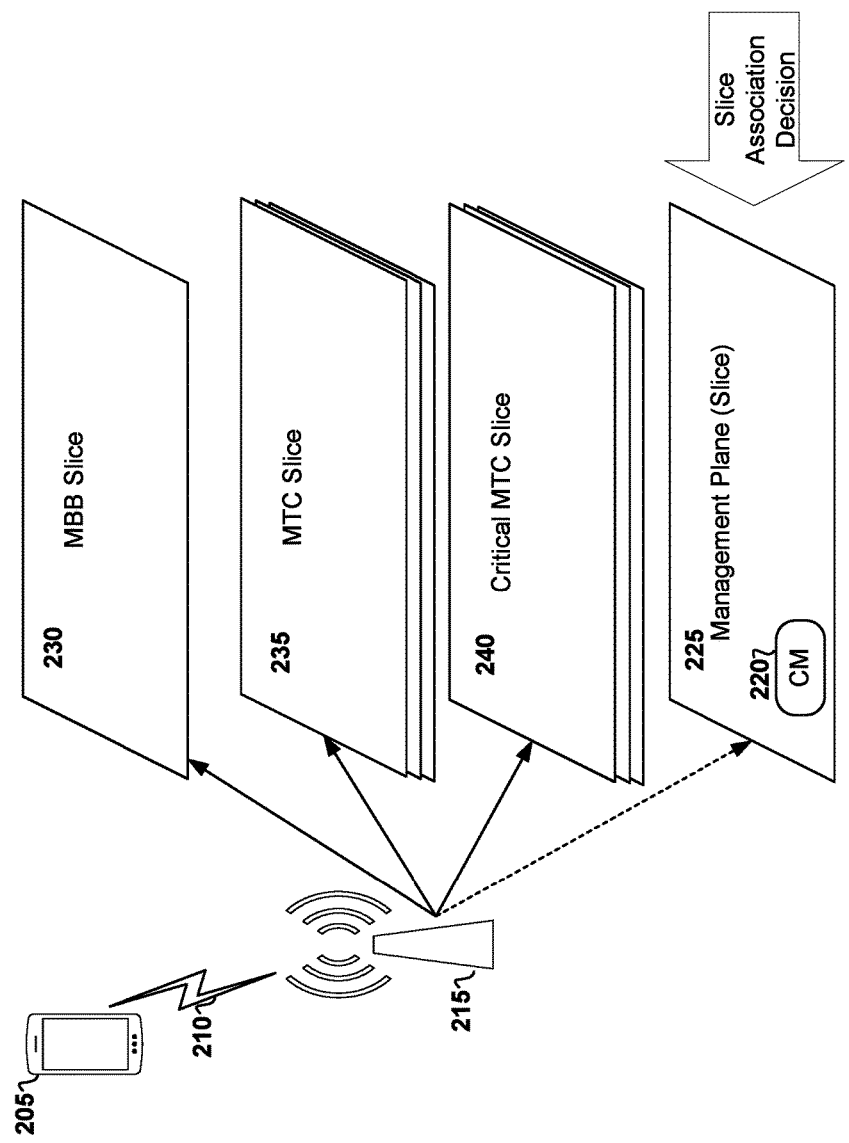
FIG. 2A illustrates network slice association within the management plane, in accordance with some embodiments of the present invention.

FIG. 2A illustrates network slice association occurring within a management plane 225, in accordance with some embodiments of the present invention. The management plane 225 may be a network slice holding various global functions for managing various network slices. In the present embodiment, the network slice association operation is made by the management plane (MP) connection management (CM) function 220. The CM function may be a separate VNF instantiated at a potentially arbitrary location within the network infrastructure separate from the access nodes 215. Further, the CM function can be instantiated in multiple locations within the network. As illustrated in FIG. 2A, example network slices include one or more Mobile Broadband (MBB) slices 230, one or more Machine Type Communication (MTC) slices 235, and one or more critical Machine Type Communication (MTC) slices 240. A UE 205 transmits an attach request 210 to an access node 215 of the network. The attach request is forwarded to the CM function 220.

Figure 2B:
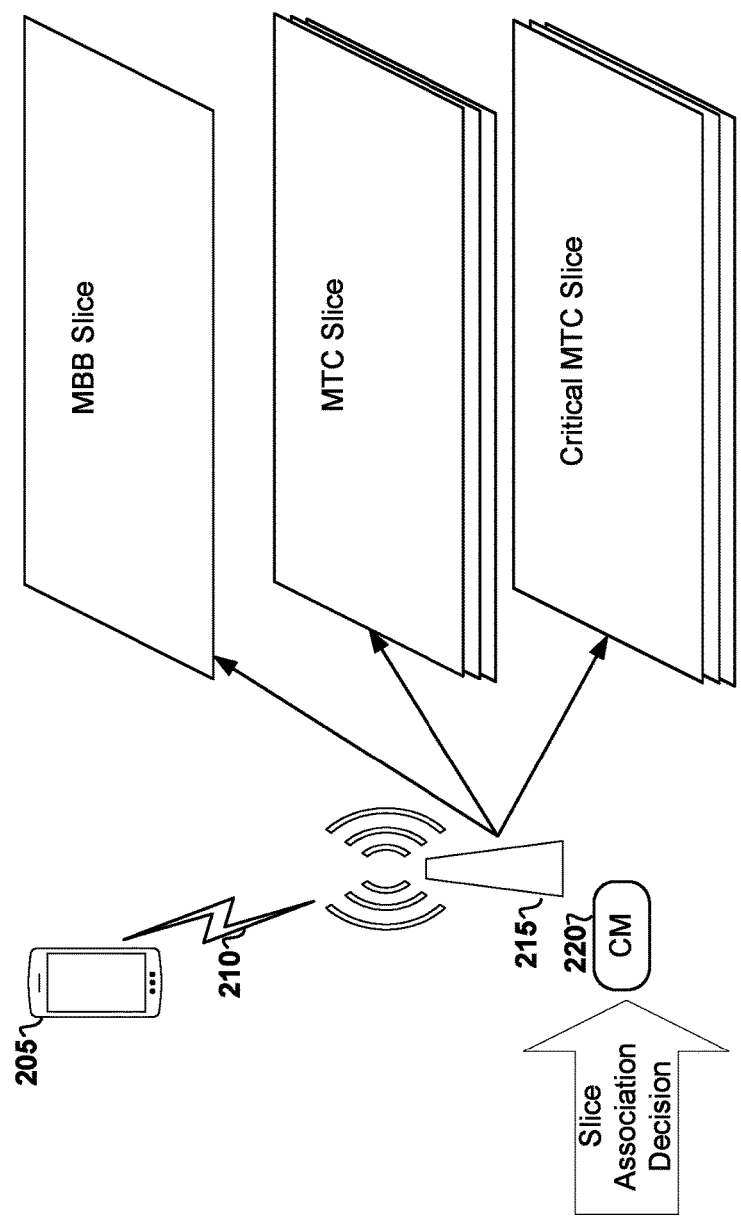
FIG. 2B illustrates network slice association at the edge of the network, in accordance with other embodiments of the present invention.

FIG. 2B illustrates network slice association operations performed by a CM instantiated at the edge of the network, in accordance with some embodiments of the present invention. The edge of the network includes an access node 215, for example, and the network slice association operation is performed by a CM function 220, which is co-located with the access node 215. A UE 205 transmits an attach request 210 to the access node 215 of the network. The attach request may be contained within a Non Access Stratum (NAS) message transmitted by the UE. The attach request is handled by the CM function 220.

In some embodiments, the CM function can be located at some or all base stations or access point-type entities in the communication network which communicate directly with mobile devices via wireless communication. These entities may be eNBs, and/or Baseband Units (BBUs) in a Cloud Radio Access Network (C-RAN) configuration. Alternatively, the CM function may be located at another entity that is associated with a base station or access point-type entity. A CM function at multiple locations may be replicated in its entirety at each location or instantiated in a distributed manner across the locations.

In various embodiments, the instructions transmitted by the connection manager include an indication that the mobile device is to be associated with a specified network slice out of a plurality of network slices. The indication may be provided by forwarding an attach request initially transmitted by the mobile device, possibly by encapsulating the attach request in another control message. The attach request is forwarded to a local or service-specific connection manager corresponding to the specified network slice.

In some embodiments, the indication that the mobile device is to be associated with the communication network includes an identifier indicative of, or correlated with, a particular network slice. Upon receipt of the indication, the connection manager determines the particular network slice based on the identifier. As such, the selection of the network slice may be explicitly or implicitly defined within the indication. The mobile device may therefore explicitly request association with a particular network slice. For example, the mobile device may transmit an attach request including a network slice identifier which specifically indicates the network slice to which the mobile device is to be associated. As another example, the mobile device may transmit an attach request including a mobile device identifier which is correlated, via a pre-arranged correspondence stored in a lookup table, to a particular network slice to which the mobile device is to be associated.

Associating a network slice with the mobile device can include management and control plane operations, for example performed by the service-specific connection manager. For example, association may include authenticating the mobile device, authenticating a network slice to the mobile device, confirming an authorization of the mobile device, admitting the mobile device to a network slice, establishing signaling and data bearers for the mobile device, establishing network forwarding rules supporting the mobile device, and transmitting an attach response to the mobile device indicating that association has been performed.

A network slice in an association operation may be newly instantiated, currently in the process of being instantiated, or pre-existing.

In some embodiments, an entity within the network may assign the UE to a particular network slice. For example, the entity may assign the UE to a particular network slice when the UE does not request a particular network slice association, or when the requested network slice association is overridden by the entity.

Network slice association may include selecting which network slice, of a plurality of network slices, is to be associated with a given mobile device, and arises in relation to the possibility that a given UE may belong to one or more instantiated network slices. A slice association determination indicates which network slice the UE is to attach to. The associated network slice corresponds to the portion of the communication network which will carry voice and/or data traffic toward and from the mobile device, as well as process said traffic when necessary. The associated network slice may provide at least some, or substantially all, of the functions and services of the communication network as they apply to the mobile device. Because different network slices may have different capabilities, network slice association can include selecting a network slice which is capable of satisfying the current communication requirements of a mobile device, by having access to an adequate portion of communication network resources.

In some embodiments, particulars of the network slices may be described by a network service Descriptor (NSD). For example, in some embodiments, the NSD contains a network slice identifier (NS ID), which, once determined for example by obtaining the NS ID from a broadcast channel or by another method, can be included in the header of an uplink (UL) packet to indicate the appropriate network slice associated with that packet.

In some embodiments, the NS ID may be obtained by the mobile device via unicast or multicast communication. For example, a mobile device may transmit an initial message, such as a network attach request, and a network access node may transmit a message indicating the NS ID back to the mobile device in response to the initial message. The mobile device may then include the NS ID in a network slice association message. In some embodiments, multiple NS IDs may be transmitted to the mobile device, and the mobile device may select one NS ID for inclusion in the network slice association message.

In some embodiments, after an initial network slice association determination made by the CM, control plane packets are forwarded by the CM to a local service-specific connection manager which is specific to the network slice to which attachment is being made. An initial network slice association may indicate the initial associations between network slices and UEs. In some embodiments, initial slice associations may be subsequently changed or overridden by the CM or another entity.

Following the initial network slice association, control plane packets can be forwarded to a service-specific connection manager (CM) or customer service manager (CSM) or to a legacy or service specific MME. Data plane packets can be forwarded to a service specific SGW (v-s-SGW). Forwarding may be performed by a responsible packet handling entity, such as a base station or access point-type entity at the edge of the core and radio access network. Other nodes will serve these forwarding and management functions at different points in the network topology.

Network Slice Association Details

Embodiments of the present invention relate to a method, apparatus and system for establishing a connection between a UE and a selected network slice. As discussed above, the connection manager may either be located at a base station or access point-type entity communicating directly with the UE, or at another location in the network infrastructure. Particular connection establishment procedures corresponding to various embodiments of the present invention are described below.

According to some embodiments, the UE transmits an attach request to a serving access node (AN), in association with a given service request to be accommodated by a network slice. The UE may send a separate attach request for each service request. The AN may be a base station or access point-type entity. The attach request may include a network slice ID (NS ID), if known. Each network slice is associated with a network slice ID (NS ID) by which it can be unambiguously identified. The NS ID can be obtained by the UE, for example via receipt of messages transmitted by the network and indicative of available NS IDs. In some embodiments, information indicative of available NS IDs can be included in an existing or dedicated SystemInformationBlock (SIB). Mechanisms for obtaining the NS ID include receiving the NS ID via customer pre-configuration or via a broadcast, unicast or multicast message. As an alternative, the UE may transmit another ID, which is correlated with the NS ID by an entity within the network for example via a table lookup operation.

In some embodiments, when a UE can attach to one of a plurality of network slices, or when the UE is permitted to attach concurrently to two or more of the plurality of network slices, the UE may select an NS ID corresponding to a network slice to which attachment is to be made. The UE then indicates which network slice an attach request pertains to by including the corresponding NS ID in its transmitted attach request.

In some embodiments, the UE is configured to include an identification of a type of network slice, selected from a plurality of types, in the attach request. Types of network slices can include MBB slice, MTC slice, and critical MTC slice, for example. The UE can identify the type of network slice by transmitting parameters such as network service description parameters as part of an attach request or other message. In some embodiments, a UE is configured to indicate its network service requirements in the attach request. The requirements may include latency and bandwidth requirements, QoS requirements, network resource requirements, and cost requirements, for example. A network slice association function, for example of the global connection manager, may be configured to determine which slice to select for association with the UE based at least in part on the identification of type of network slice or the indicated requirements.

In some embodiments, a corresponding SystemInformationBlockType (SIB Type) is defined for each network slice that has been instantiated. Each SIB Type can convey information related to its corresponding network slice, such as NS ID and descriptive information.

In some embodiments, a single SIB Type can be defined and used to describe multiple, and possibly all, network slices that have been instantiated, for example in a particular region. The common SIB Type can convey information related to multiple corresponding network slices, such as NS ID and descriptive information.

In some embodiments, the NS IDs of appropriate network slices available for each UE may be stored in a Home Subscriber Server (HSS). Following authentication of a UE, the HSS may compile and transmit a list of NS IDs to which the UE can request attachment.

In some embodiments, when the (global) connection manager is located at an access node (AN) and thus the network slice association is performed at the AN, the AN performs a NAS node selection function by selecting a service-specific CM of a network slice indicated by the NS ID contained in the attach request. The AN then forwards the attach request to the selected service-specific CM.

In some embodiments, when the (global) connection manager is located in the network infrastructure, for example as a VNF in the network separate from the AN, the AN forwards the attach request to the separate connection manager. The connection manager then determines a network slice to associate with the UE and selects a service-specific CM of the determined network slice. The connection manager then forwards the attach request to the selected service-specific CM. Alternatively, the connection manager may transmit the network slice association operation to the AN, which then selects a service-specific CM of the determined network slice and forwards the attach request thereto.

The network slice association operation transmitted to the AN may comprise a message which includes a NS ID of the determined network slice.

In various embodiments, the service-specific CM initiates an authentication procedure in association with the service-specific Authentication, Authorization and Accounting (AAA) server and/or HSS. If the UE is determined to be authorized, the service-specific CM sends an attach response indicating the UE is admitted. The attach response may include a NS specific parameter such as a NS specific UE ID.

In some embodiments, the UE may send an attach request without necessarily reading the broadcast channel to determine the NS ID. In this case, the NS ID may be associated with the UE ID a priori, for example by pre-programming the NS ID into the UE by customer pre-configuration. The attach request may then be configured to include both the UE ID and the NS ID. In some embodiments, a network service may be associated with a network slice type, which may be associated with the NS ID. This approach may be used for example when the UE is only capable of or authorized to attach to a certain pre-defined network slice, such as when the UE is a MTC device attaching to an MTC server.

In some embodiments, the (global) CM is configured to determine the NS ID based on the UE ID. In this case, the UE does not need to obtain the NS ID, for example by reading the broadcast channel. Rather, the UE ID and NS ID are pre-associated and can be determined by the CM. In this case the attach request includes the UE ID but excludes the NS ID. This approach may be also be used when the UE is only capable of or authorized to attach to a certain pre-defined network slice.

Figure 3:
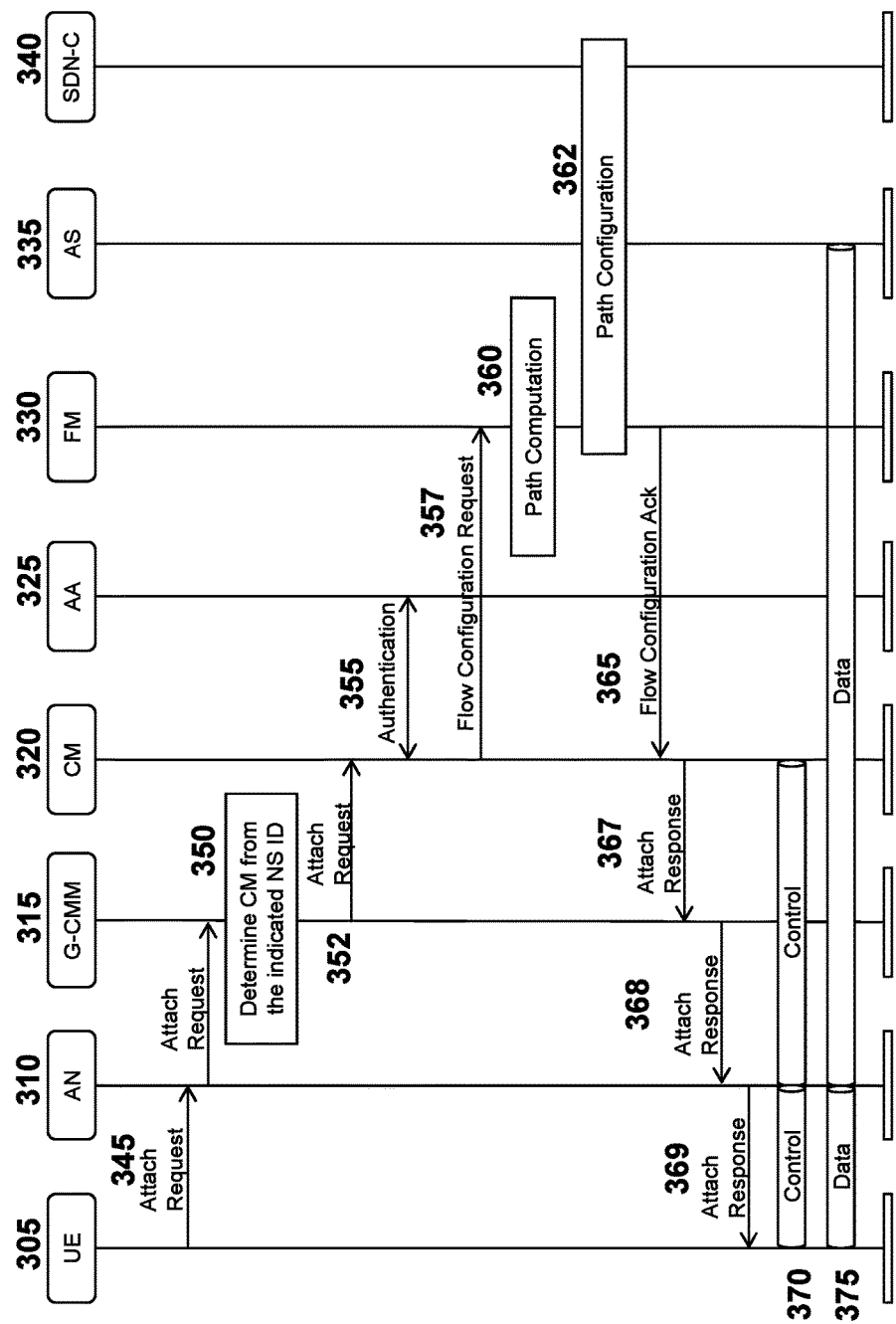
FIG. 3 illustrates a procedure for connecting a device to a network slice, in accordance with some embodiments of the present invention.

In more detail, and in relation to the above, FIG. 3 illustrates a connection establishment procedure in accordance with some embodiments of the present invention. In such embodiments, the Global Connection and Mobility Manager (G-CMM) is located in the network infrastructure and performs the network slice association. A UE 305 transmits an attach request 345 to an AN 310, which forwards the attach request to the G-CMM 315. The attach request 345 includes a NS ID. The G-CMM determines a service-specific CM 320 specific to an appropriate network slice, based on the NS ID indicated in the attach request 345.

Figure 4:
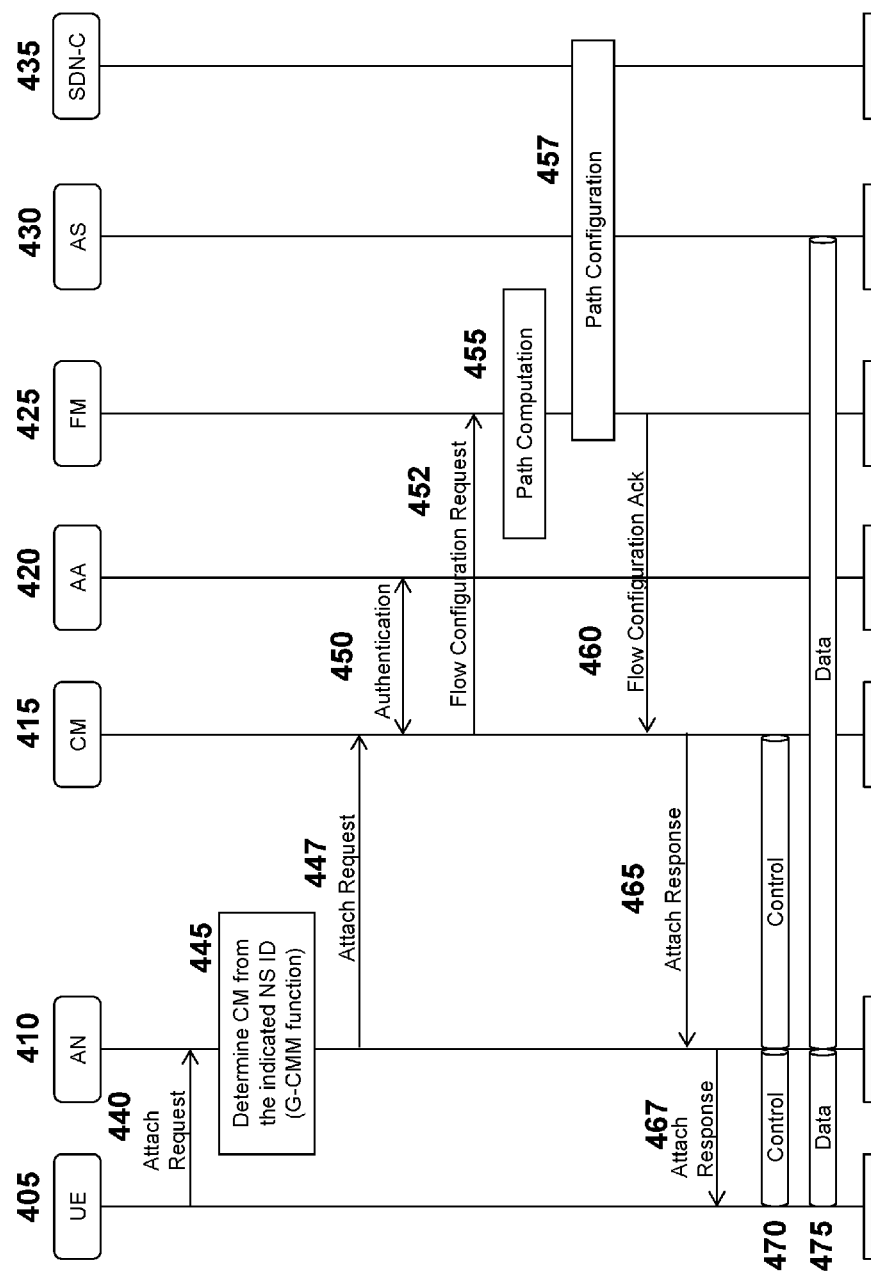
FIG. 4 illustrates a procedure for connecting a device to a network slice, in accordance with some embodiments of the present invention.

FIG. 4 illustrates a connection establishment and/or attachment procedure in accordance with another embodiment of the present invention. In this case, the G-CMM is at least partially located at an access node (AN) and performs the network slice association. A UE 405 transmits an attach request 440 to an AN 410. The attach request 440 includes a NS ID. The AN determines 445 a CM 415 specific to an appropriate network slice, based on the NS ID indicated in the attach request 440. This determination may be performed by the G-CMM integrated into the AN 410.

Having further regard to FIG. 3 and FIG. 4, the attach request is forwarded 352, 447 to the service-specific CM 320, 415 and an authentication procedure 355, 450 between the service-specific CM 320, 415 and the AA 325, 420 is performed. Following successful authentication, the service-specific CM 320, 415 transmits a flow configuration request 357, 452 to a FM 330, 425. The FM performs path computation operations 360, 455 and then the FM, in conjunction with an application server (AS) 335, 430 and the SDN-C 340, 435, performs path configuration operations 362, 457.

Also, the FM 330, 425 transmits a flow configuration acknowledgement message 365, 460 to the service-specific CM 320, 415. Further attach response messages 367, 368, 369, 460, 465, 467 are propagated through the G-CMM and AN to the UE. Control plane messaging 370, 470 and data plane messaging 375, 475 may follow. Alternatively, control plane messaging and data plane messaging may not be performed immediately but rather may be deferred until after a service request is received and/or network traffic is present.

In various embodiments, if it is determined during authentication that the UE is authorized to attach to the network slice, the service-specific CM is configured to send an attach response indicating the UE is admitted to the network slice. The attach response may include a NS-specific parameter such as a NS-specific UE ID identifying the network slice.

In various embodiments, in order to facilitate network slice association determination operations made in the network, solutions similar to those proposed in the 3GPP document TR 23.707, "Architecture Enhancements for Dedicated Core Networks; Stage 2," V. 13.0.0, Dec. 17, 2014, may be employed. A first such solution corresponds to a redirection after update location procedure, for example as identified in Section 5.2.1.1.1.2.1 of TR 23.707. A second solution corresponds to re-routing before NAS security setup, for example as identified in Section 5.2.1.1.1.2.2 of TR 23.707. A third solution corresponds to "null-NRI"/"null-MMEGI" based redirection, for example as identified in Section 5.2.1.1.1.2.3 of TR 23.707. A fourth solution corresponds to MME triggered handover, for example as identified in Section 5.2.1.1.1.2.4 of TR 23.707. These solutions can be implemented in order to assign a dedicated MME.

In various embodiments, for example in association with some or all of the above connection management operations, the attach request provided by the UE is redirected to a dedicated MME associated with the network slice identified in the attach request.

Figure 5:
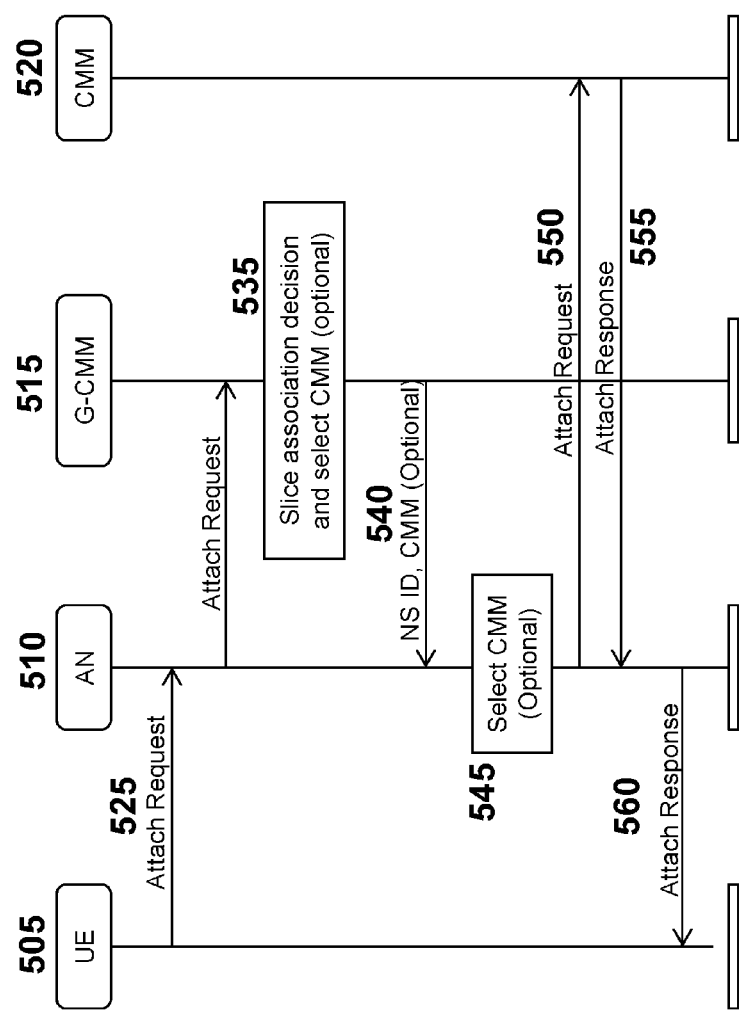
FIG. 5 illustrates a network slice association procedure, according to an embodiment of the present invention.

FIG. 5 illustrates a network slice association procedure, according to some embodiments of the present invention. With reference to FIG. 5, a G-CMM 515 selects an appropriate service-specific CMM 520 and forwards both the NS ID and an identifier of the selected CMM to an access node 510. This is performed to redirect a UE's attach request to the selected service-specific CMM. In more detail, a UE 505 transmits an attach request 525 to the AN 510. The AN 510 forwards the attach request to the G-CMM 515 residing in the network. The G-CMM then makes a network slice association operation 535, corresponding to a determination 535 of which slice the UE is to attach to. Such a determination may be performed for example when a particular network slice is not identified in the attach request. Additionally, the G-CMM may optionally select the service-specific CMM 520 associated with the determined network slice. The G-CMM then transmits a message 540 to the AN 510 indicative of the NS ID of the determined network slice, along with an indication of the selected service-specific CMM, if applicable. If an indication of a selected service-specific CMM is not provided to the AN, or if the indication is invalid, the AN 510 may optionally select 545 the service-specific CMM for example based on the NS ID. The AN then forwards the attach request message 550 to the selected service-specific CMM 520. The service-specific CMM, or more specifically a CM portion thereof, initiates an attachment procedure and transmits an attach response message 555 to the AN 510. The AN forwards the attach response message 560 to the UE 505.

Alternatively, in some embodiments, the G-CMM forwards the attach request to the service-specific CM directly after determining the network slice association. In this case, the AN forwards the attach request to the G-CMM. The G-CMM performs the network slice association operation, and forwards the attach request to the selected CMM. The request specifies the serving AN. The CMM then sends the attach response to the G-CMM, which then forwards the response to the serving AN.

Figure 6:
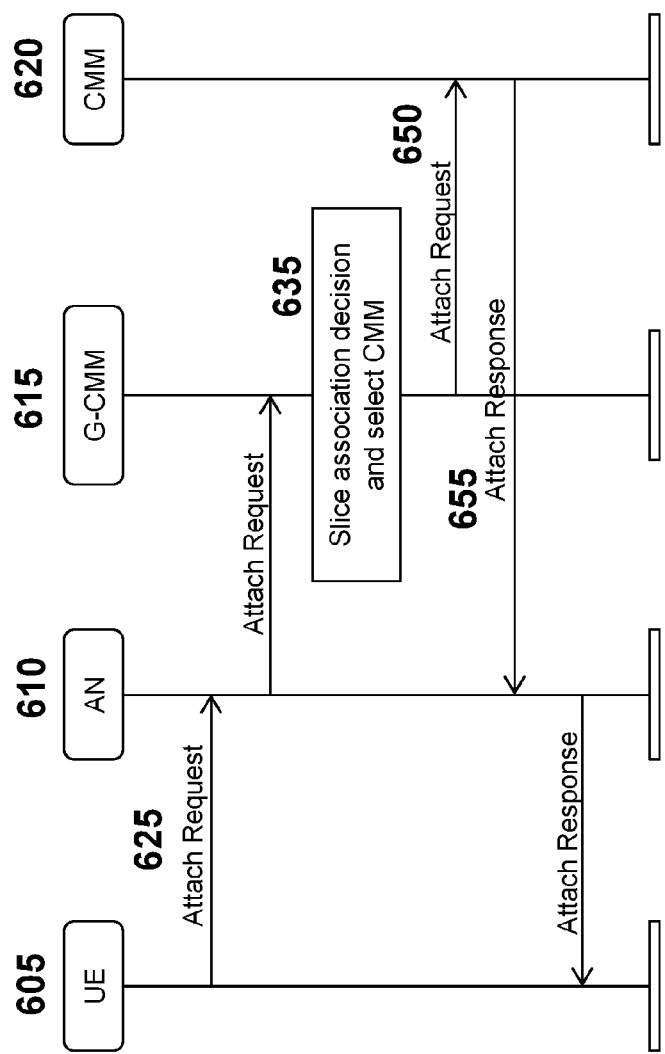
FIG. 6 illustrates a network slice association procedure, according to another embodiment of the present invention.

As yet another alternative, in one embodiment the service-specific CMM receives the attach request directly from the G-CMM, as illustrated in FIG. 6. In more detail, a UE 605 transmits an attach request 625 to an access node (AN) 610 such as an eNB. The AN 610 forwards the attach request to a G-CMM 615 residing in the network. The G-CMM then performs a network slice association operation 635, corresponding to a determination 635 of which slice the UE is to attach to. Additionally, the G-CMM selects a service-specific CMM 620 associated with the determined network slice. The G-CMM then transmits an attach request message 650 to the selected service-specific CMM 620. The service-specific CMM initiates an attachment procedure and transmits an attach response message 655 to the AN 610. The AN forwards the attach response message to the UE 605.

Because the AN determines the network slice association based on the contents of the NAS message containing the attach request, the connection establishment procedure is configured to include a network slice association function. The network slice association function is performed before the NAS Node Selection function, which selects a particular local (service-specific) CMM for the UE.

In some embodiments, various UE devices, such as MTC devices, may be associated with a Service ID (SID), such as a MTC SID. The serving AN is configured to determine the associated SID based on a substantially unique ID of the UE device, such as its MTC ID. For example, the serving AN can specify the UE device ID in a lookup operation performed on a local or remote lookup table, the lookup operation returning the SID corresponding to the UE device ID. The serving AN is configured to then forward the MTC traffic to an IP address corresponding to the MTC SID, which is mapped to a NS ID.

Figure 7:
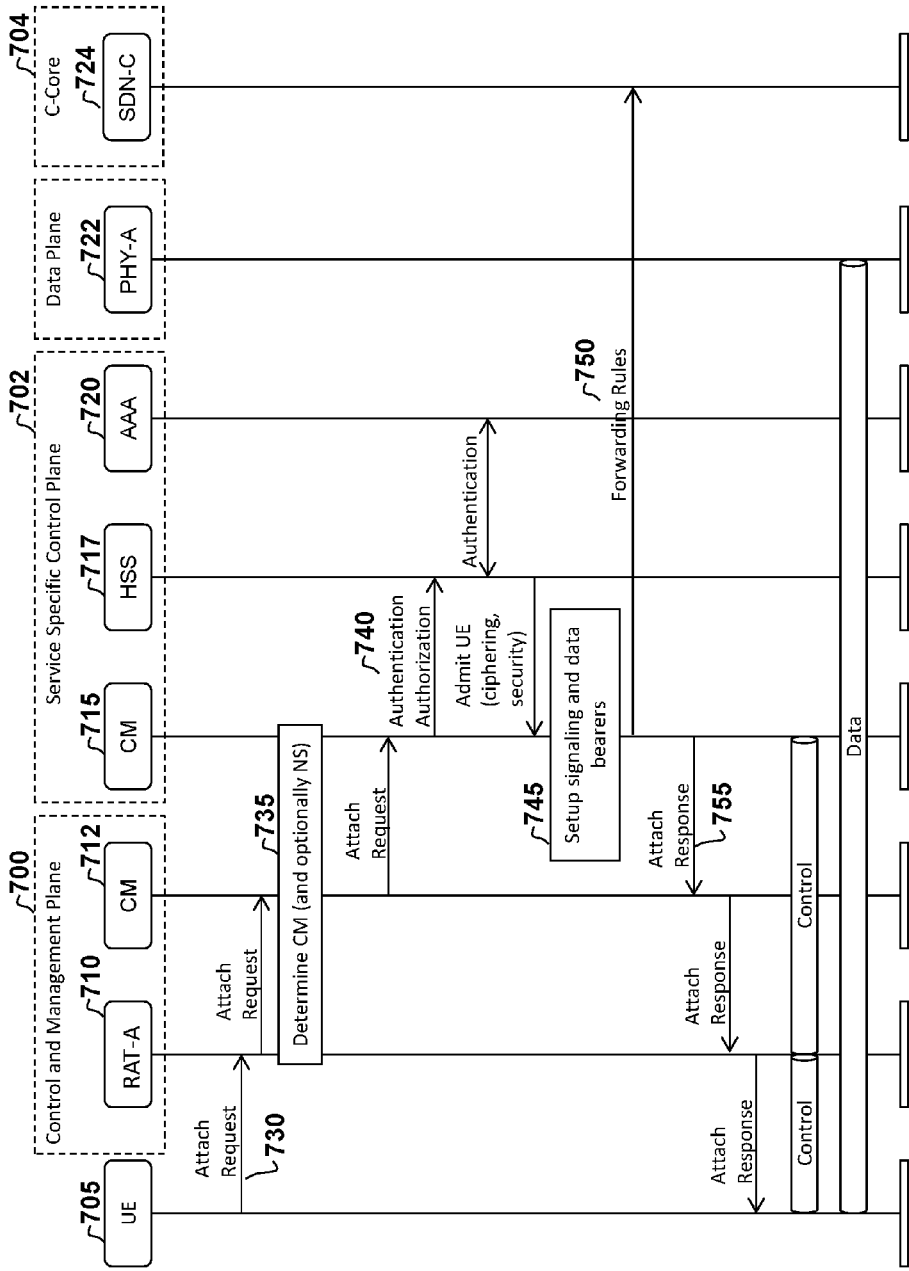
FIG. 7 illustrates signaling flow associated with an attach request, in accordance with some embodiments of the present invention.

FIG. 7 illustrates signaling flow associated with an attach request, in accordance with embodiments of the present invention. As illustrated, the attach request propagates from the UE through the control and management plane 700 and service-specific control plane 702. Authentication and authorization are initiated within the service-specific control plane. Forwarding rules are established in association with the SDN-C of the cloud-based core network (C-Core) 704. An attach response is propagated back to the UE.

In more detail, the process illustrated in FIG. 7 includes obtaining, by the UE 705, the NS ID from the broadcast channel, or retrieving a customer-pre-defined NS ID. The process further includes receiving, from the UE, an attach request 730 associated with a service request at a RAT-A access node 710. In some embodiments, the attach request includes a network slice identifier (NS ID). In other embodiments, the attach request does not include a NS ID. The process further includes, by the CM function 712, determining 735 a service-specific connection management (CM) function 715 in a service-specific control plane 702 that corresponds to a particular network slice. When the attach request includes a NS ID, the network slice may be as indicated by the NS ID. The process further includes forwarding the attach request to the service-specific connection management (CM) function 715. The process further includes performing, by the CM function, an authentication and/or authorization procedure 740 indicative of whether the UE is authorized for access to the network slice. The procedure may include interaction between the service-specific CM function 715, an HSS 717 and an AAA server 720. The process may further include establishing, by the service-specific CM function, establishing 745 signaling and data bearers, and establishing forwarding rules 750, both supporting the attachment of the UE to the network slice. The process further includes, when the UE is authorized for access to the network slice, sending an attach response 755 to the UE indicative that the UE is admitted. A PHY-A node 722 in the data plane and a SDN-C 724 in the C-Core 704 are also illustrated, the SDN-C receiving the forwarding rules 750.

When the attach request does not include a NS ID, both the NS and the CM may be determined 735 by the CM function 712. For example, the attach request provided by the UE may include a UE identifier (UE ID) or other information, and the CM function may determine the NS ID based on this provided information.

Network Architecture

Embodiments of the present invention provide for communication network control plane and/or data plane functions for supporting network operations in general and network slicing operations in particular. The data plane functions may be used to facilitate operation of the network slices. Control plane functions include one or more of: connection management functions such as global connection and mobility management (G-CMM) functions; local or service-specific connection management (CM) or connection and mobility management (CMM) functions for example residing in specific network slices; flow management (FM) and traffic engineering (TE) functions; authentication and authorization (AA) functions; global customer service management (G-CSM) functions; and local or service-specific customer service management (CSM) functions for example residing in specific network slices. Data plane functions include one or both of: data analytics (DA) manager functions; and caching and forwarding (CF) manager functions. Throughout the present disclosure, a CMM function may be replaced with one or both of a connection management (CM) function and a mobility management (MM) function.

In various embodiments, a global function is configured to operate in coordination with one or more local or service-specific functions of the same type. For example, a G-CMM may operate in coordination with one or more service-specific CMMs (or CMs and/or MMs), and/or a G-CSM may operate in coordination with one or more service-specific CSMs. The coordinated operation may comprise message passing between functions. The local or service-specific functions may operate at least partially under the direction of the corresponding global function. For example, the global function may configure operating parameters of the local function. In some embodiments, the global function may handle operations of an inter-slice scope, while the local functions may handle operations of an intra-slice or service-specific scope. The global and local functions may provide a distributed overall function having a branched structure, with the global function as the root node and the local functions as branch nodes.

Figure 8A:
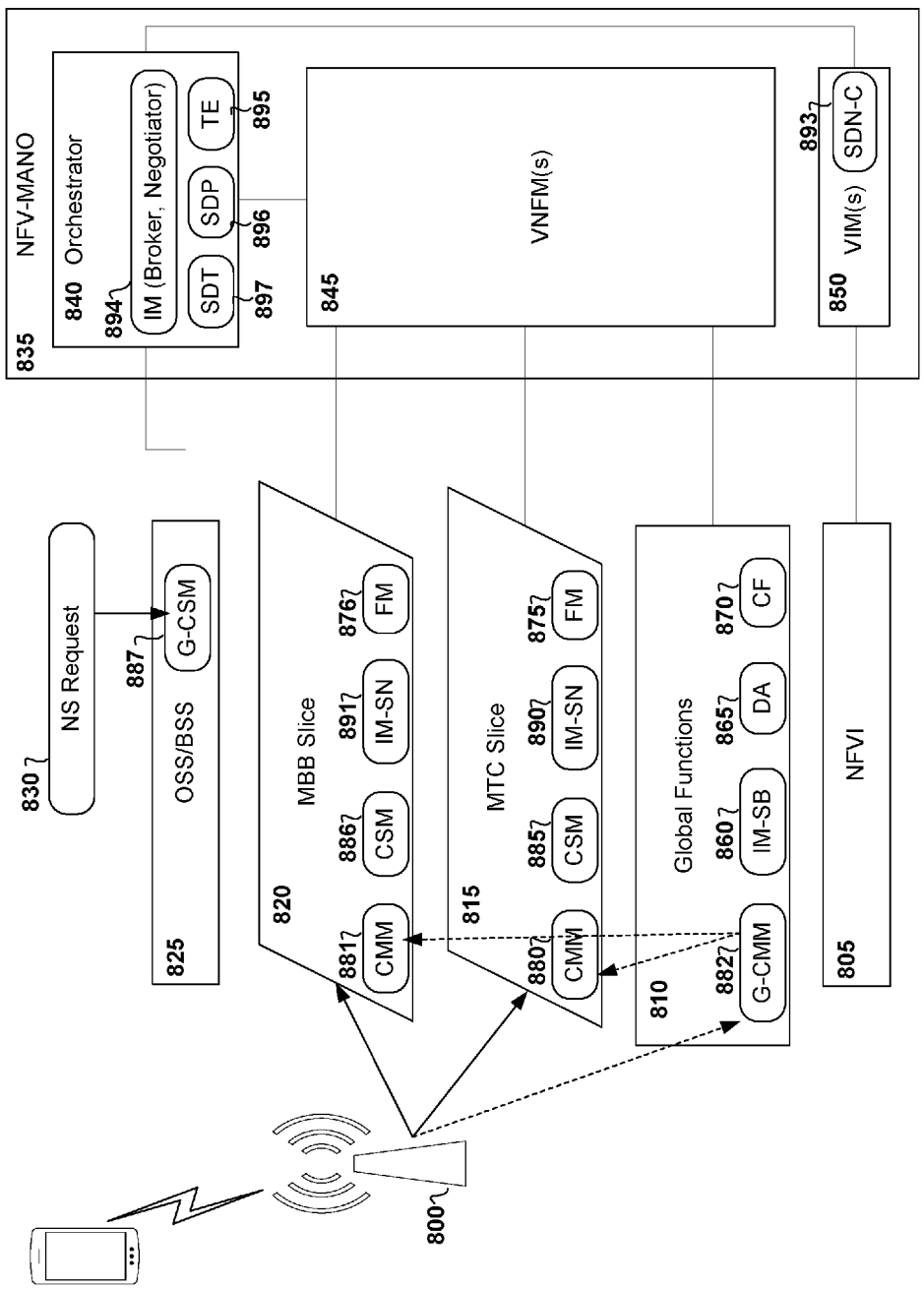
FIG. 8A illustrates an overview of the communication network architecture in accordance with embodiments of the present invention.

FIG. 8A illustrates an overview of the communication network architecture in accordance with embodiments of the present invention. A Network Function Virtualization Management and Orchestration (NFV-MANO) entity 835 includes an orchestrator function 840, a virtual network function manager (VNFM) function 845 and a virtual infrastructure manager (VIM) function 850. According to some embodiments, the functionality of the orchestrator function 840, VNFM function 845 and VIM function 850 can be as defined in ETSI GS NFV 001 and ETSI GS NFV 002, for example. It should be appreciated that the NFV-MANO as illustrated in FIG. 8A provides one way to conceptually and/or functionally organize network operations, however other ways of organizing network operations may also be used.

According to embodiments, the VIM function 850 is configured to manage the network function virtual infrastructure (NFVI) 805 which can include physical infrastructure, virtual resources and software resources in a NFV environment. For example physical infrastructure can include servers, storage devices network interfaces, etc. Virtual resources can include virtual computing machines. According to embodiments, there can be plural VIM functions within a particular NFV architecture, wherein each VIM function is responsible for the management of its respective NFVI.

According to embodiments, the VNFM function 845 can be configured to manage the virtual network functions (VNF) and can manage the lifecycle of the VNFs. For example the VNFM function 845 can create, maintain and terminate VNF instances, which can be installed on virtual machines that are created and managed by the VIM function 850. The VNFM function 845 can also be configured to provide fault management, configuration, accounting, performance and security management (FCAPs) of the VNFs. In addition, the VNFM function 845 can be configured to scale-up and scale-down one or more of the VNFs which can result in the scaling-up and scaling-down of the usage of one or more central processors which provide computational power for realizing the VNFs. In some embodiments, each VNFM function manages a separate VNF or a single VNFM function manages multiple VNFs.

According to some embodiments, the orchestrator function 840 is configured to coordinate, authorize, release and engage the NFVI resources by interaction with the VIM function 850. The orchestrator function 840 may also be configured to support end-to-end service creation between different VNFs by interaction with the VNFM function 845.

FIG. 8A further illustrates a plurality of network slices and a global control plane 810 used for network slice management. The global control plane 810 controls functions across multiple and potentially all network slices of the communication network. The global control plane 810 may be regarded as a separate network slice in some embodiments. The illustrated network slices include at least one Mobile Broadband (MBB) network slice 820 and at least one Machine Type Communication (MTC) network slice 815; although other types of network slices may be provided.

In some embodiments, both the global control plane functions and the service-specific control planes functions are instantiated at desired locations in the network by the NFV-MANO entity, to provide connection management across a plurality or all of the network slices. The location of these functions may depend on performance criteria such as delay requirements of different network services being provided.

The functions configured within the global control plane 810 can include a connection manager such as the global connection and mobility management (G-CMM) function 882, an infrastructure management (IM) function which can contain a broker function and a negotiator function for obtaining computing, storage and network resources for core network functions. In some embodiments the IM function contains a spectrum broker (IM-SB) function 860 which is configured to obtain spectrum resources. Data Analytics (DA) function 865 and the cache and forwarding (CF) function 870 can be instantiated within a global control plane 810. In some embodiments, DA 865 may be instantiated within control plane 810 but have the ability to monitor traffic within the data plane, while in other embodiments, DA 865 may be instantiated within the data plane (possibly with a second instantiation within the control plane 810).

In more detail, the G-CMM function 882 is configured to maintain a list of instantiated network slices and parameters associated with each network slice. Parameters may include, for example, Operator ID and service type. The G-CMM function 882 is further configured to maintain a pool of connection and mobility management (CMM) functions, wherein each CMM function is instantiated as a local service-specific function corresponding to a particular network slice. The G-CMM function 882 is further configured to perform the initial association of a UE to a network slice, as previously described.

The G-CMM function 882 may operate across multiple network slices which are involved with connection and mobility management for multiple slices. In certain embodiments the G-CMM function 882 may perform additional functions. For example, the G-CMM function 882 may determine which network slice a User Equipment (UE) should attach to in response to an attach request. This may include determining which network slice handles portions of the attach request. Alternatively, the G-CMM function 882 may perform network slice association using extended capabilities of the access node 800. The G-CMM function 882 may also manage each network slice during roaming. For example, the G-CMM function may handle intra-operator inter-slice roaming, and/or inter-operator roaming. When handling inter-operator roaming, the G-CMM function 882 may send an inter-operator handover request to the G-CSM, or send an inter-operator handover request to a target G-CMM. The G-CMM function 882 may also assign a UE, currently associated with access node 800, to a different network slice upon determining that the UE has roamed outside a coverage area of the network slice. This may assist in providing a seamless or near-seamless slice handover. The G-CMM function 882 may also track a UE's association with one or more network slices.

Having regard to the above, a method is provided for managing a mobile device attach request in a communication network having a plurality of network slices, according to an embodiment of the present invention. The method includes instantiating a global connection and mobility management (G-CMM) function in the communication network. The G-CMM function is configured to operate across the plurality of network slices. The method includes selecting an appropriate network slice from the plurality of network slices with the G-CMM function. The method further includes attaching the mobile device to the appropriate network slice. In some embodiments, the communication network includes an access node with which the mobile device is associated, and the method further includes determining and attaching, by the G-CMM function, the mobile device to the appropriate network slice using extended capabilities of the access node.

Having further regard to the above, a method is provided for performing a network slice handover from a first operator infrastructure to a second operator infrastructure. The method includes receiving a handover request from a network slice associated with the first operator infrastructure. The method further includes transmitting the handover request to at least one of a global customer service management (G-CSM) function and a global connection and mobility management function (G-CMM) instantiated in the second operator infrastructure.

Having further regard to the above, a method is provided for managing a mobile device roaming between a first coverage area associated with a first network slice and a second coverage area associated with a second network slice. The method includes associating the mobile device with the first network slice when the mobile device is in the first coverage area. The method further includes associating the mobile device with the second network slice when the mobile device is in the second coverage area.

Having further regard to the above, a method is provided for managing a mobile device associated with a first network slice in a communication network. The method includes instantiating a global connection and mobility management (G-CMM) in the first network slice. The method further includes determining if the mobile device is in a coverage area of the first network slice with the G-CMM function. The method further includes assigning the mobile device to a second network slice when the mobile device is outside of the coverage area of the first network slice.

It will be understood that mobile UEs can move from a slice associated with a first operator to a slice associated with a second operator. This corresponds to a slice-enabled version of an operator-to-operator handover as described in existing wireless standards. Additionally movement of a UE from a slice of a first operator to a slice of a second operator may be explicitly triggered by a UE operator, such as the first operator. This allows the UE operator to switch service providers for a variety of reasons, such as cost and reliability of service in a particular location.

In some embodiments and under certain circumstances, the UE operator may move a UE from a first slice to a second slice if both slices are provided or managed by the same operator. Such a move may be performed for a variety of reasons. For example, in situations where the UE operator uses a number of different infrastructure or telecommunication service providers, different slices may have different cost structures, and the UE operator may select a different slice to which to move the UE based on operating cost. At various times, it may be advantageous to move UEs, or groups of UEs, from one slice to another, for example, to reduce costs. Moving UEs between slices can also be performed to implement load balancing, or to move UEs from a slice with a variable cost structure based on traffic to another slice with a fixed base fee.

In some embodiments, lifecycle management of the G-CMM function 882 is performed by the VNFM function 845 Lifecycle management refers to the instantiation, termination, scaling up/down and scaling in/out of virtual infrastructure. Scaling out may include instantiating new VNFs, at either the same location as another VNF in the network, or at a new location. Scaling in may include terminating VNFs. Scaling up of infrastructure may include allocating new resources to existing VNFs. By providing an existing VNF with a variable mix of additional processing power, additional memory and additional bandwidth allocation (or by generally increasing the resources available to the VNF), an existing VNF can be made more robust and capable of handling more traffic. Scaling down infrastructure may include reducing the resources allocated to an associated VNF. The G-CMM function 882 may be instantiated by the VNFM function 845 and/or VIM function 850. The G-CMM function 882 can also be scaled in or out by the NFV-MANO entity 835 as required, for example, as new network slices are instantiated or terminated.

The data analytics (DA) function 865 is configured to collect statistics across multiple and potentially all network slices. The information collected by the data analytics function can be used to optimize performance of network slices. The DA data can be used to help modify CF rules, and to modify the topology of a slice in a software defined topology environment.

The cache and forward (CF) function 870 is configured to manage the cached content across multiple and potentially all network slices. Caching of content may involve storing data content closer to anticipated or frequent users.

In some embodiments, the network architecture further includes a global customer service management (G-CSM) function 887 which is configured to receive the network service (NS) requests 830 and respond to the NS requests in cooperation with the orchestrator function 840 of the NFV-MANO entity 835. The G-CSM function 887 is configured to maintain a pool of customer service management (CSM) functions. Each CSM function is instantiated as a local service-specific function corresponding to a particular network slice. Service-specific CSM functions may include charging, QoE control, and UE context management related to charging and QoE, for example. The G-CSM function 887 is further configured to track and/or perform charging operations, for example customer billing operations, across multiple or potentially all network slices. The G-CSM function 887 can be configured to monitor network slices and provide feedback to the orchestrator function 840 indicating the performance of network slices. The feedback may be used perform fine-tuning of the network and its computing resources, as managed by the VNFM function 845 and the VIM function 850.

Another method for managing a customer service request in a communication network is described as follows. The method includes instantiating 610 a global connection and mobility management (G-CMM) function in the communication network. The method further includes receiving 620 the customer service request by the G-CMM function. The method further includes determining 630 if the customer service request can be accommodated using an existing networks slice. The method further includes instantiating 640 a new network slice to accommodate the customer service request when the customer service request cannot be accommodated using the existing network slice.

According to some embodiments, the G-CSM function 887 can be functionally integrated within the Operational Support System/Business Support System (OSS/BSS) 825. The OSS can be configured to support back-office activities which aid in operating a communication network. The OSS can be configured to provision and maintain customer services. The BSS can include support customer-facing activities, for example billing order management, customer relationship management, and call centre automation. In some embodiments, the G-CSM function 887 communicates with the orchestrator function 840 using the OS-MA-NFVO interface, which provides communication between the OSS/BSS 825 and the orchestrator function 840.

According to some embodiments, the G-CSM function 887 can be instantiated within the network but external to the OSS/BSS 825. In this configuration, another interface, which is not necessarily defined within the present NFV framework, is configured to provide communication between the G-CSM function 887 and the orchestrator function 840.

In some embodiments, the G-CSM function 887 is configured to handle inter-operator roaming. This may comprise changing a UE's attachment status from a network slice of a first operator to a network slice of a second operator, or responding to a UE changing its attachment status.

With further reference to FIG. 8A, various network slices, for example the MBB slice 820 and MTC slice 815, may each include their own service-specific connection and mobility management (CMM) functions 881, 880 and/or their own service-specific customer service management (CSM) functions 886, 885. The service-specific CMM functions 881, 880 may be invoked and at least partially controlled by the G-CMM function 882 operating within the global control plane 810. Each network slice may further include a flow management (FM) and/or traffic engineering (TE) function 876, 875 which can be configured to tune the performance of the network slice by dynamically analyzing, predicting and regulating behaviour of data transmitted over that network slice. In addition, each of the network slices may further include an authentication and authorization (AA) function.

The CMM functions 880, 881 may be service-specific VNFs, and functions may perform connection management (CM) and mobility management (MM) functions. The MM functions may be instantiated on an "as needed" basis according to the network slice.

Connection management functions may include handling UE attachment to network slices, legacy support functions including, Domain Name Service (DNS) functions, Dynamic Host Configuration Protocol (DHCP) functions, determining cloud candidate sets for UEs (e.g. the set of possible cloud services that the UE may need access to, or the set of possible could services that can be used to serve the UE requirements), and determining power saving operating parameters, as will be apparent to those skilled in the art. Legacy support functions may include bearer management, Packet Data Network Gateway (PDN GW) selection, and SGW selection. DNS functions may include resolving logical names to Internet Protocol (IP) addresses for Evolved Packet Core (EPC) nodes. DHCP functions may include delivering IP configuration information to/for UE's. Power saving operating parameters may include discontinuous reception (DRX) cycles in connected or idle mode, which can be based on a power savings policy.

A method for performing connection management (CM) in a communication network, according to an embodiment of the present invention, is described as follows. The method includes providing a network slice. The method further includes attaching a mobile device to the network slice. The method further includes instantiating a CM function in the network slice. The method further includes determining a cloud candidate set for the mobile device using the CM function. The method further includes communicatively coupling the mobile device to the cloud candidate set.

A power savings method for a mobile device communicatively coupled to a communication network is described as follows. The method includes providing a network slice. The method further includes attaching the mobile device to the network slice. The method further includes instantiating a connection management (CM) function in the network slice. The method further includes determining power savings operating parameters with the CM function. The method further includes managing power of the mobile device according to the power savings operating parameters.

Mobility management functions may include one or more of: Evolved Packet system connection management (ECM) idle UE reachability functions, tracking UE locations, tracking area list management or paging (for example, when uplink beaconing is not used), and roaming. MM functions may also be optionally configured when required by a network service. Tracking UE locations may include UE location tracking using uplink beacons, and UE location prediction functions.

In certain embodiments, the CM and MM functions may be combined into a single CMM VNF having component CM and MM functions. In this case, the MM component function may be configured upon being required by the network slice. In other embodiments, the CM and MM functions may comprise separate VNFs. The MM VNF may be instantiated on an as-needed basis.

Lifecycle management of the CMM functions 880, 881 may be performed by the VNFM function 845. The CMM functions 880, 881 may comprise element manager (EM) functions (not shown) which can be internal or separate to the CMM functions 880, 881. In certain embodiments, the CMM functions 880, 881 may transmit performance metrics to the EM or VNFM function 845. In response, the EM or VNFM may trigger a scale-in or scale-out operation, for example as VNFs are instantiated or terminated.

In some embodiments, each network slice further includes a service-specific infrastructure management function containing a spectrum negotiator function (IM-SN) 891 890. In some embodiments, the IM-SN function is external to its associated network slice, for example residing within a set of Cloud Radio Access Network (C-RAN) functions.

In some embodiments, there is provided a method for scaling network slices in a communication network. The method includes instantiating a connection and mobility management (CMM) function within at least one network slice. The method further includes determining performance metrics using the CMM function. The method further includes scaling the network slices according to the performance metrics determined by the CMM function.

Although only a single access node 800 is shown in FIG. 8A for clarity and illustrated by the "tower icon", it will be readily understood that multiple access nodes are supported. In embodiments, an access node throughout the various figures may correspond to one or more Remote Radio Units (RRUs) operatively coupled to one or more Baseband Units (BBUs) or the like.

In accordance with embodiments of the present invention, the NFV-MANO entity 835 further includes NFV management plane functions configured to: define the network topology for a network service (NS) request; determine the transport protocols to be used across links; and determine the physical links between different network functions used by the network service. In some embodiments, the NFV management plane functions are integrated within the orchestrator function 840 and include a software defined topology (SDT) function 897, a software defined protocol (SDP) function 896 and a software defined resource allocation (SDRA) function.

According to embodiments, the SDT function 897 is instantiated as part of the orchestrator function 840. The SDT function 840 is configured to determine the Point of Presence (PoP) for each VNF in the VNF forwarding graph (VNFFG) provided by the G-CSM function 887. The SDT function 840 is also configured to determine the logical links between the VNFs in the VNFFG.

According to embodiments, the SDRA function is configured to select physical links for supporting each logical link defined in the VNFFG. The SDRA function includes two functional components, namely the SDN Controller (SDN-C) function 893 and the traffic engineering (TE) function 895. The SDN-C function 893 is instantiated within each VIM function 850 and is configured to provide forwarding rules for use by the forwarding switches, for example routers and the like within the physical network architecture. The TE function 895 is instantiated within the orchestrator function 840 and is configured to perform path computations for determining data communication paths to be used between source nodes and destination nodes in the network. The computed paths may be selected and configured to provide adequately high performance. The computation may include dynamically analyzing, predicting and regulating behaviour of data transmissions. In one embodiment, the TE function performs only the path computation between the source node and destination node of each flow. The forwarding rules are then transmitted to the SDN-C function via the VIM function using the OR-VI interface (Orchestrator-to-Virtual Infrastructure). In another embodiment, the TE function performs the path computation and also determines the capacity bounds for some or all physical links for some or all network slices. The capacity bounds are sent to the flow management (FM) function in each network slice, which performs flow splitting to limit or avoid violating the capacity bounds. The capacity bounds are transmitted via the OR-VI interface to the VIM function. The VIM function then determines and transmits the forwarding rules to the SDN-C function and the FM function. In general, the traffic engineering and flow management calculations can be distributed in different ways between the TE function and FM function. The information exchanged between the TE function and the FM function is transmitted from the orchestrator function to the VIM function using the OR-VI interface. The VIM function transmits the rules to the SDN-C function and the SDN-C function transmits information to the FM function for flow-management-related calculations. Those skilled in the art will appreciate that at either extreme of the distribution of the functionality between TE function and FM function, one of the entities can be assigned all responsibilities, while the other is assigned none. It should be noted that both of these extreme cases, along with blends between the two, can be supported.

Figure 8B:
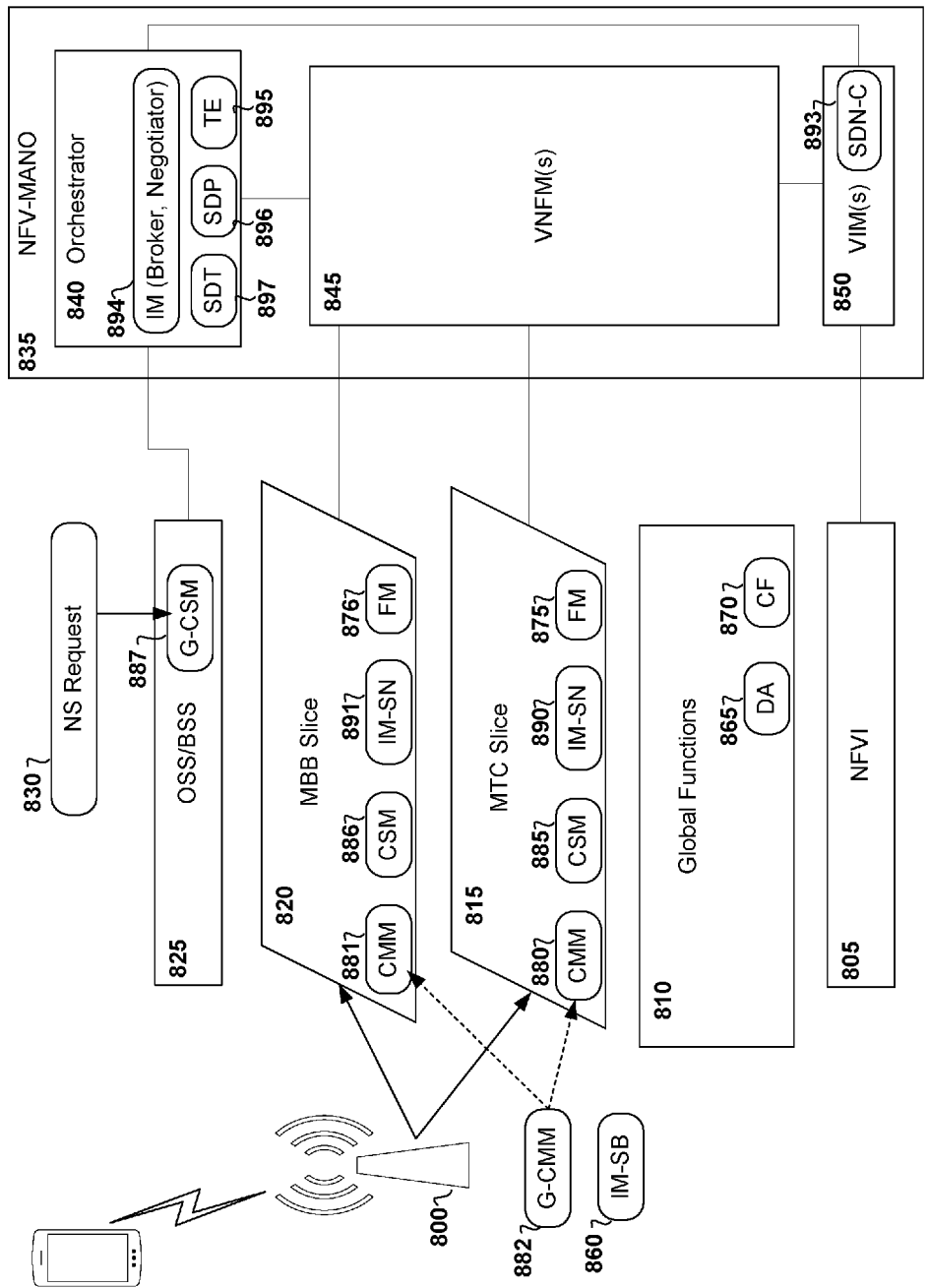
FIG. 8B illustrates an overview of the communication network architecture in accordance with embodiments of the present invention.
Figure 8C:
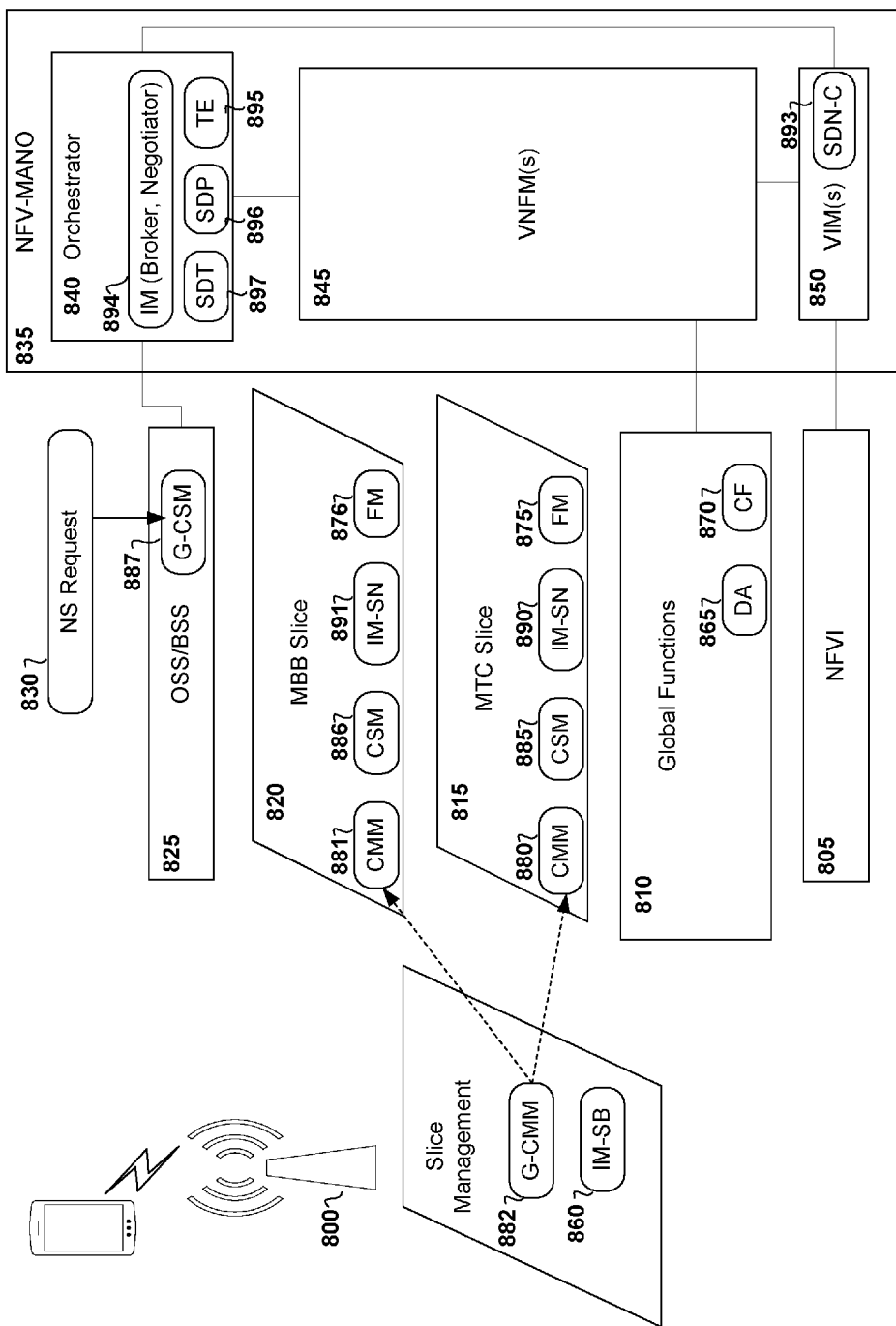
FIG. 8C illustrates an overview of the communication network architecture in accordance with embodiments of the present invention.

In some embodiments of the present invention, traffic engineering operations are allocated between the TE function and FM functions in the network architectures of FIGS. 8A to 8C in at least three different ways. First, the TE function may perform path computations to determine the capacity bounds for each physical link for each network slice. The FM function may then split the flows along predetermined paths, while attempting to respect per-slice capacity bounds. Second, the TE function may perform both path computation and flow management across multiple or all links and network slices, thereby precluding the need to instantiate the FM function for certain network slices. Third, the TE function may perform path computation and determine capacity bounds for each physical link for each network slice. These computations can be done on a per-service basis instead of a per flow basis. Because the computations do not consider flows, it may allow the preclusion of the need to instantiate the FM function for certain network slices.

A method for transmitting packets between a source node and a destination node in a communication network is described as follows. The method includes associating a network slice with the source node. The method further includes instantiating a flow management (FM) function in the network slice. The method further includes instantiating a traffic engineering (TE) function in the communication network. The method further includes performing, using the TE function, path computations to determine paths and capacity bounds for links between the source node and destination node for the network slice. The method further includes splitting flows along the determined paths using the FM function. The method further includes transmitting packets between the source node and the destination node along the determined paths. The method further includes managing flows to attempt to ensure that the determined capacity bounds are respected using the FM function.

A method for transmitting packets between a source node and a destination node in a communication network is described as follows. The source node is associated with a network slice. The method includes instantiating a traffic engineering (TE) function in the communication network. The method further includes performing, using a TE function, path computations to determine paths and capacity bounds for links between the source node and destination node for the network slice. The method further includes transmitting packets between the source node and the destination node according to the determined paths. The method further includes managing traffic to attempt to ensure that the determined capacity bounds are respected, using the TE function.

According to embodiments, the SDP function 896 is instantiated as part of the orchestrator function 840. The SDP function 896 is configured to determine the transport protocol stack for each of the logical links defined in the VNFFG.

In some embodiments of the present invention, an authentication and authorization (AA) function is provided and configured to perform functions including: UE identity check, location updating, and authentication. For example, an AA VNF may be instantiated for each network slice. The AA VNF can communicate with a CM so that the CM can obtain authentication information of a UE during an attach request. The AA VNF may also be communicatively connected to AA VNFs of other network slices to provide or obtain AA related services.

FIG. 8B illustrates an overview of the communication network architecture in accordance with another embodiment of the present invention. The illustrated architecture is similar to that of FIG. 8A, except that the G-CMM function 882 which controls the service-specific CMM functions of the individual network slices is removed from the global control plane 810 and integrated with the access node 800. In this embodiment, the IM-SB function 860 can also be integrated with the access node 800 along with the G-CMM function 882.

FIG. 8C illustrates an overview of the communication network architecture in accordance with another embodiment of the present invention. The illustrated architecture is similar to that of FIG. 8A, except that a slice management control plane 855 is further provided which includes the G-CMM function 882 and the IM-SB function 860. The slice management control plane 855 is instantiated either at the RAN or at another location within the network architecture, while being separated from the access node 800 and the global control plane 810.

Network Slice Instantiation

Embodiments of the present invention relate to a method, apparatus and system for performing network slice instantiation. Network slices can be instantiated dynamically in response to a need or in anticipation of such a need. Network slices can be instantiated in a variety of ways and with a variety of features and configurations.

In some embodiments, a network slice of a first type is provided. Some or all network slices of a communication network may be of the first type. The network slice of the first type includes control plane functions but does not necessarily include all data plane functions required for the network slice's operation. Rather, some or all of the data plane functions may reside outside of the network slice, and may be shared between multiple network slices. The control plane for the network slice is instantiated separately by the NFV-MANO entity. Further, the control plane functions of a network slice of the first type are isolated from other network slices. A function included in a network slice uses the resources allocated to the network slice, such as communication, computing and memory resources, to carry out its operation.

In some embodiments, the instantiated network slice is configured to include control plane functions for exclusive use by the network slice.

Further, for network slices of the first type, data plane functions may be instantiated, either within or outside the slice, on an as-needed basis. Data plane functions which are not required need not be instantiated.

Data plane functions may be shared among network slices, for example by providing a data plane function within a set of common network resources which is accessible by multiple slices. The set of common network resources may itself reside within a network slice.

In some embodiments, a network slice of a second type is provided. Some or all network slices of a communication network may be of the second type. The network slice of the second type is configured to include both control plane functions and data plane functions. Some or all of the data plane functions may be provided for exclusive use by the network slice.

In various embodiments, a request to instantiate a network slice of the second type contains a VNFFG. The VNFFG may contain both control plane functions and data plane functions, if required. In some embodiments, some or all functions in the VNFFG are instantiated by the MANO entity.

In various embodiments, data plane functions belonging to a network slice of the second type are shareable among multiple network slices. A network slice may therefore exclude or share at least one data plane function to be used by the network slice.

In some embodiments, when a network slice of the second type is instantiated, an SDT function determines the PoPs for new functions created with the slice and determines the logical links between new functions, and between new and existing functions. In some embodiments, data plane functions are instantiated when they are specified in the VNFFG for a network service request which acts as a trigger for network slice instantiation.

Further, for network slices of the second type, control plane functions within the network slice are isolated from other slices. Isolation may be achieved by allocating dedicated sets of resources for providing the control plane functions, which are separate from the resources used for providing functions of other network slices. The sets of resources may include processing resources, memory resources, and communication resources, such as communication media and routing facilities.

Figure 9:
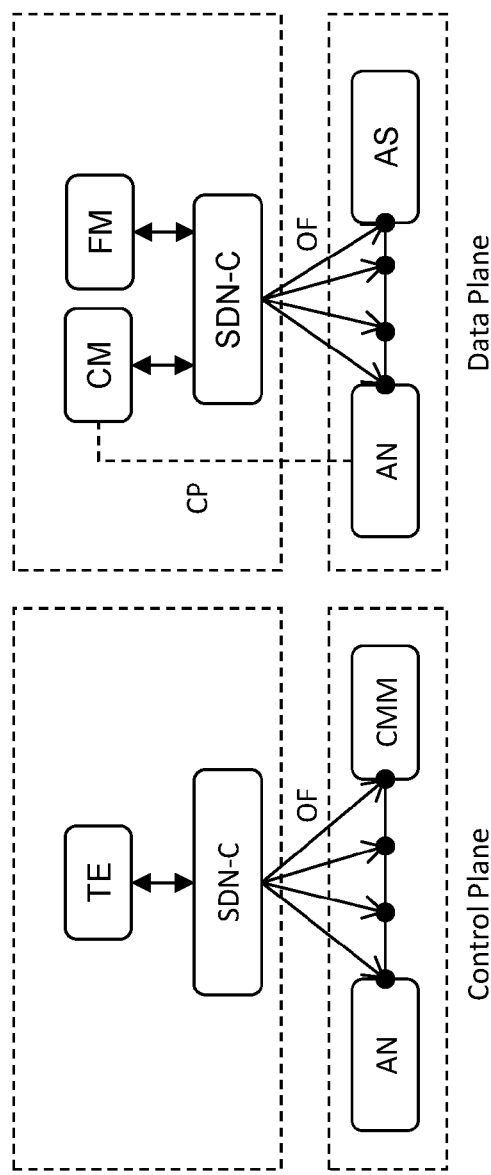
FIG. 9 illustrates a network slice, according to an embodiment of the present invention.

FIG. 9 illustrates aspects of a network slice which may be of the first type or the second type, according to embodiments of the present invention. In a non-sliced network, traffic can be decoupled into a data plane and a control plane. The control plane is a logical construct that allows control messages between functions and nodes to be treated differently than the data transmitted between the nodes. As illustrated in FIG. 9, a similar logical construction can be used within a slice. Control of functions within the slice can be managed within a control plane. The nodes within the data plane transmit control information and statistics to control entities, such as the CM. The CM is a part of the control plane, which governs the actions and control of the traffic in the data plane. Both the control and data planes can include functions instantiated by an SDN controller.

Figure 10:
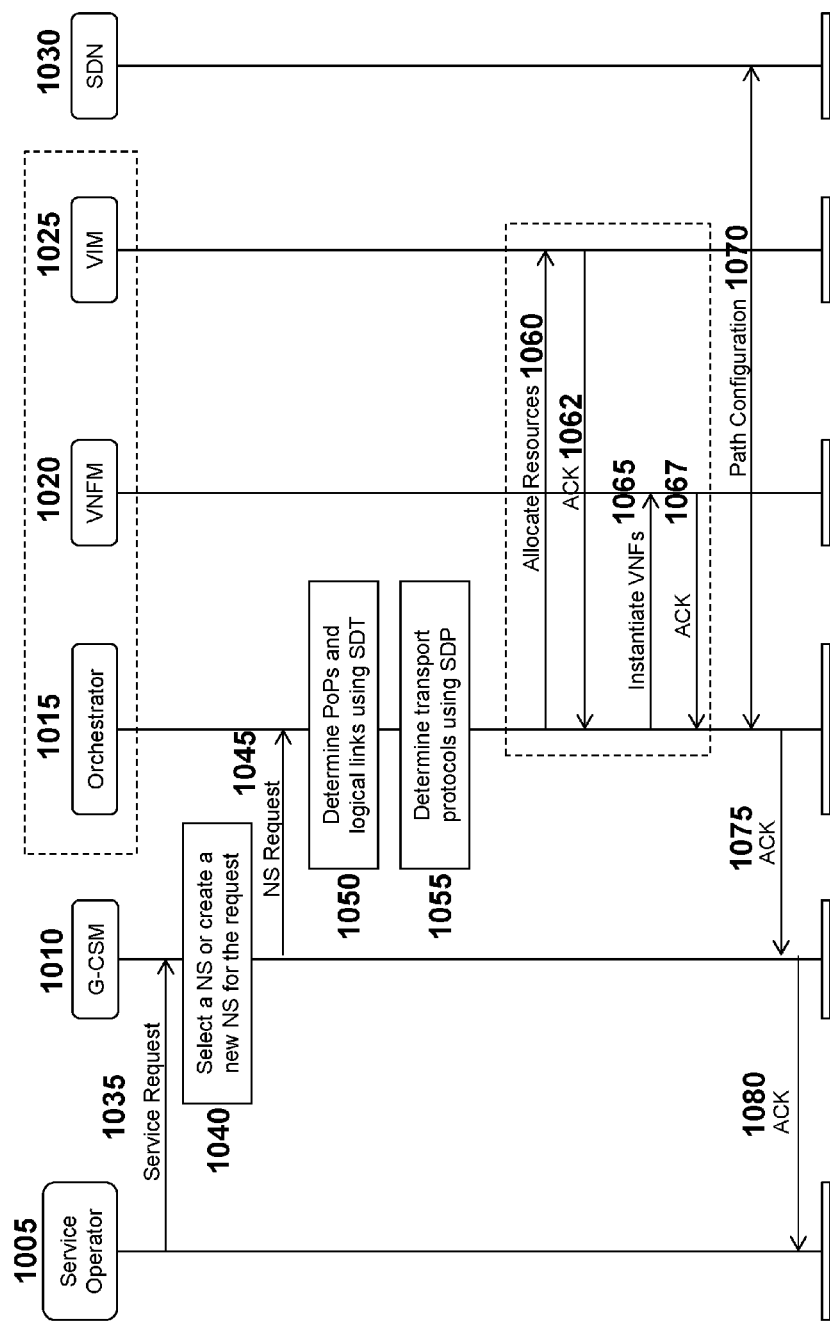
FIG. 10 illustrates a network slice instantiation procedure, according to an embodiment of the present invention.

Having reference to FIG. 10, embodiments of the present invention provide for a network slice instantiation procedure. The instantiation procedure may be used for instantiating network slices of the first type or the second type. The instantiation procedure includes receiving, at a G-CSM 1010, a customer and/or network service request 1035 from a service operator 1005. The service request indicates that a customer has specific requirements to be met by a network slice. In response to the service request, the G-CSM determines 1040 whether to select an existing network slice (NS) for accommodating the service request, or to create a new network slice for accommodating the service request.

In various embodiments, the service request does not necessarily indicate that a new slice is required. Rather the service request may contain performance requirements for the service, such as QoS requirements, network resource requirements, and/or bandwidth requirements. The G-CSM receives the requirements and determines if a new slice is required based on same.

In some embodiments, an existing network slice may be selected for use if it has sufficient capacity and is appropriate to use for accommodating the network service request. For example, an existing network slice can be selected when the service functions needed to support the service request are already present in the slice and/or can be instantiated in the slice, and when the admission of the new traffic corresponding to the network service can be accommodated along with existing requirements of the network slice. When an existing network slice is selected, required network functions that are not present in the slice may be instantiated and network function customization necessary for supporting the new network service requests can be undertaken. Functions supporting the new service may be linked to other network functions potentially already existing in the slice. In some embodiments, additional resources can be added to the existing network slice to increase its capacity.

If a new network slice is to be created, then the G-CSM transmits a network service (NS) request 1045 to an orchestrator 1015 of the NFV-MANO entity. The NS request can include an indication of a VNFFG to be realized by the new network slice. In response, the orchestrator is configured to use its associated SDT function to determine 1050 points of presence (PoPs) of VNFs of the VNFFG, and logical links between the VNFs of the VNFFG. The orchestrator is further configured to use its associated SDP function to determine 1055 one or more transport protocols for use by the logical links between the VNFs of the VNFFG.

Once the determinations of PoPs, logical links and transport protocols is made, slice instantiation proceeds, for example in accordance with existing MANO procedures. As illustrated, the orchestrator 1015 transmits an instruction 1060 to the VIM function 1025 to allocate resources for use by the new network slice. The VIM function 1025 performs the resource allocation and acknowledges 1062 the instruction. The orchestrator 1015 then transmits an instruction 1065 to the VNFM function 1020 to instantiate the VNFs specified by the VNFFG within the new network slice. The instruction may specify information such as the determined PoPs of the VNFs to be instantiated. The VNFM function 1020 accordingly causes the instantiation operations to be performed and acknowledges 1067 the instruction.

Subsequently, path configuration 1070 is performed. The path configuration may involve operation of a traffic engineering function, for example within the orchestrator. Path configuration may involve interaction between the orchestrator 1015 and the SDN function 1030 in order to configure the paths. The SDN function, which may be associated with a SDN-C, may provide the forwarding rules for use by forwarding switches to provide data paths between the instantiated VNFs and other entities associated with the network slice.

Subsequently, the orchestrator transmits an acknowledgement 1075 to the G-CSM, indicative that the network slice instantiation is complete, and the G-CSM transmits an acknowledgement 1080 to the service operator 1005, also indicative that the network slice instantiation is complete.

The various details related to network slice instantiation as described above are examples, and can vary between embodiments.

Figure 11:
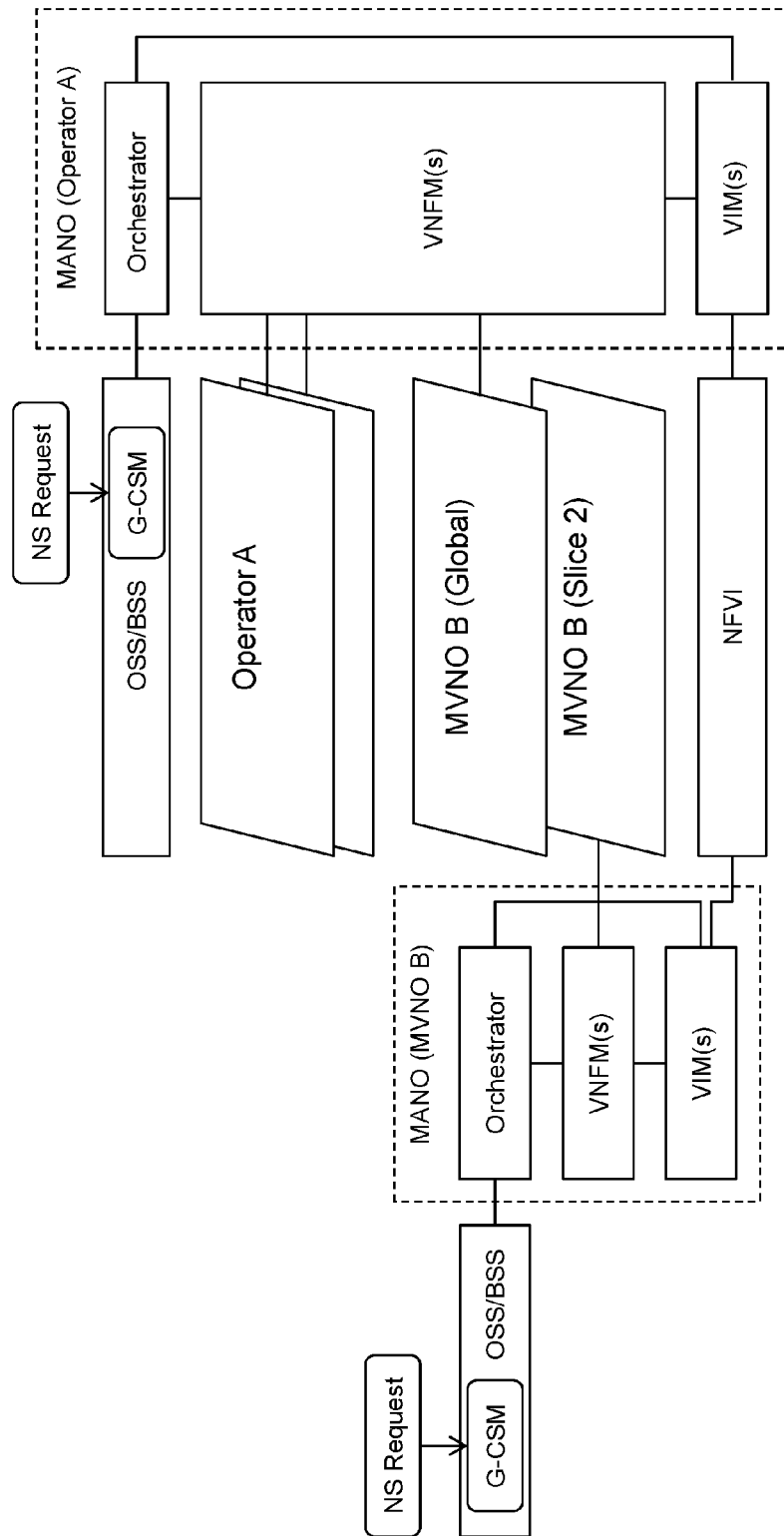
FIG. 11 illustrates network slice instantiation, according to another embodiment of the present invention.

In some embodiments, in addition to instantiating its own network slices, an operator can also instantiate NFV-MANO functions along with the global functions or a common MBB slice for an MVNO. For example, as illustrated in FIG. 11, an Operator A instantiates its own NS requests and the common slice (containing global functions) for MVNO B. MVNO B instantiates its own NS request using its own MANO. NS Requests are sent to the corresponding G-CSMs.

Figure 12:
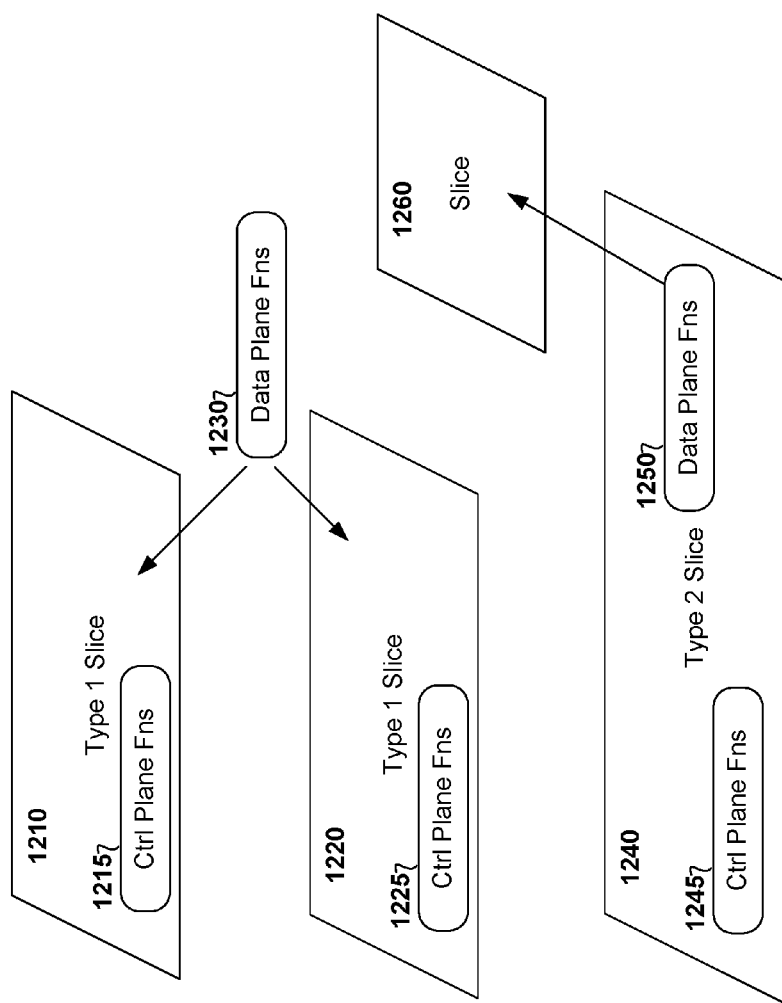
FIG. 12 illustrates multiple network slice types based on included types of functions, according to embodiments of the present invention.

FIG. 12 illustrates two network slices 1210, 1220 of a first type, which include their own control plane functions 1215, 1225 but which share data plane functions 1230 external to the two network slices. FIG. 12 also illustrates a network slice 1240 of a second type, which includes its own control plane functions 1245, and its own data plane functions 1250. Some or all of the data plane functions 1250 may be shared with another slice 1260.

Network Slice Management

Embodiments of the invention provide for a method and apparatus for managing network slices. For example, embodiments of the present invention provide for management plane functions for managing one or more aspects of instantiated network slices of a communication network.

Embodiments of the present invention involve one or more management planes separate from the plurality of network slices, the management planes configured to at least partially manage each of the plurality of network slices. Global functions, such as a global connection and mobility management (G-CMM) function, and a global customer service management (G-CSM) function, can reside within such a management plane separate from the plurality of network slices. Some or all of the plurality of network slices may provide service-specific functions corresponding to the global functions. For example network slices may include service-specific connection management and service-specific customer service management. Each service-specific function may exclusively support the network slice or slices with which it is associated.

In view of the above, embodiments of the present invention provide for a method for managing a plurality of network slices in a communication network. The method includes providing one or more management planes set apart from the plurality of network slices, the management planes configured to at least partially manage each of the plurality of network slices. The method further optionally includes configuring the management planes to provide one or both of connection management and customer service management. The method further optionally includes configuring the network slices to further provide service-specific connection management and service-specific customer service management.

In various embodiments, both the management plane functions and the control plane functions may be instantiated at a substantially arbitrary location in the network by the management and orchestration (MANO) entity in order to provide for connection management across a plurality or all of the network slices. The location of these functions may depend on performance factors such as delay requirements of different network services being provided. Further embodiments of the present invention relate to particular arrangements of the management plane functions and/or control plane functions within the network. For definiteness, the MANO may correspond to that entity which is defined by the European Telecommunications Standards Institute (ETSI) MANO working group.

Figure 13:
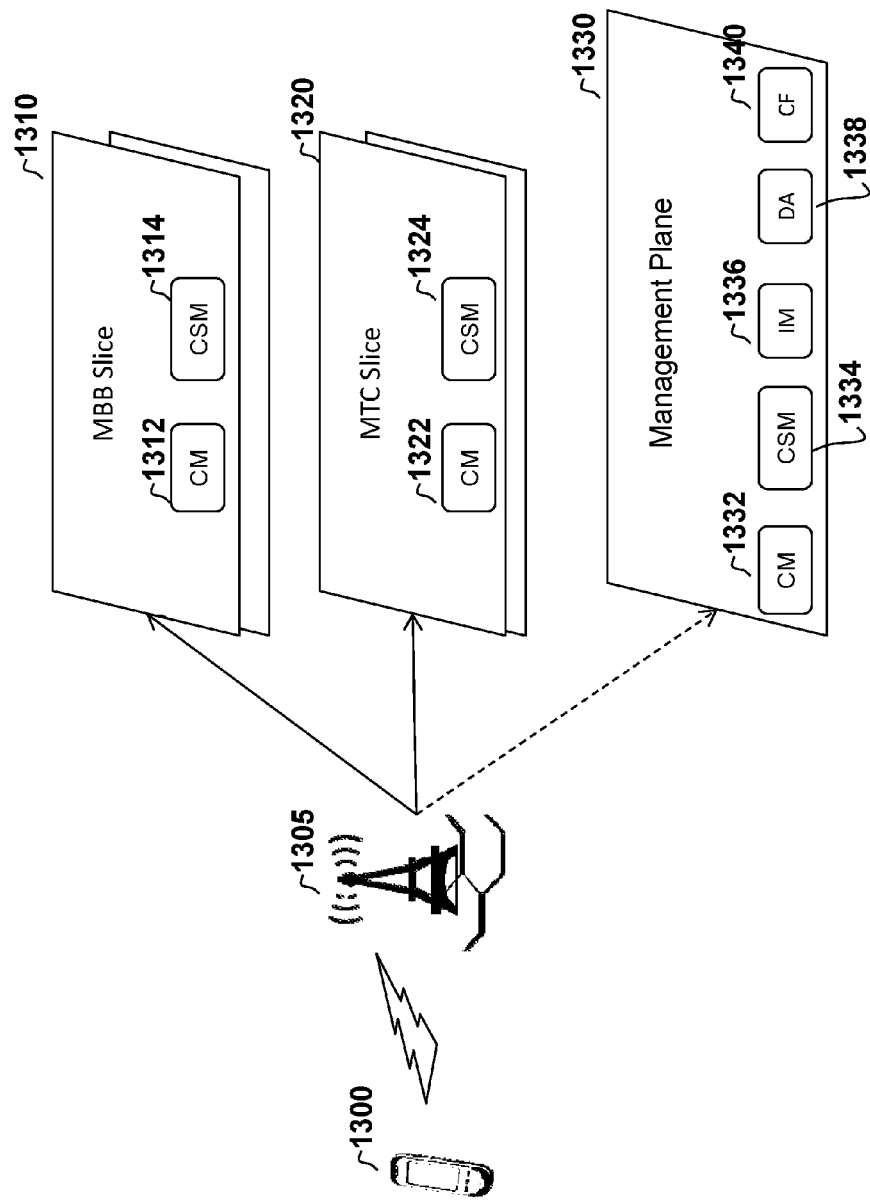
FIG. 13 illustrates a plurality of network slices and a management plane used for network slice management, in accordance with embodiments of the present invention.

FIG. 13 illustrates a plurality of network slices 1310, 1320 and a management plane 1330 used for network slice management in accordance with embodiments of the present invention. The management plane 1330 may be a separate network slice. The example illustrated network slices include a Mobile Broadband (MBB) network slice 1310 and a Machine Type Communication (MTC) slice 1320, although other types of network slices may be provided. The MBB and MTC slices may each include their own service-specific connection management (CM) functions 1312, 1322 and service-specific customer service management (CSM) functions 1314, 1324. The service-specific functions may be managed by corresponding functions in the management plane. The service-specific CM and service-specific CSM functions within each slice may be referred to as control plane functions. Although only a single UE 1300 and base station/access point/eNB 1305 are illustrated for clarity, it will be readily understood that multiple UEs and access points are supported. In various embodiments, a base station/access point/eNB 1305 may correspond to one or more Remote Radio Units (RRUs) operatively coupled to one or more Baseband Units (BBUs).

Embodiments of the present invention provide for a management plane 1330 which is configured to provide management functions across all network slices. The management plane functions may include: connection management (CM) 1332; customer service management (CSM) 1334; infrastructure management (IM) 1336; data analytics (DA) 1338; and Caching and Forwarding (CF) 1340.

In various embodiments, the management plane functions differ from the control plane functions. The management plane performs the functions across all the network slices, while the corresponding control plane functions perform the functions for the specific network slice. Each network slice can have customized control plane functions.

In more detail, the connection management (CM) function 1332 in the management plane 1330 is configured to maintain a list of the instantiated network slices and the parameters associated with the network slice (e.g. Operator ID, service type, etc.). The CM function is further configured to maintain a pool of service-specific CMs 1312, 1322 instantiated within each network slice. The CM function 1334 is further configured to perform initial association of a UE 1300 to a network slice 1310, 1320.

The customer service management (CSM) function 1334 in the management plane 1330 is configured to maintain a pool of service-specific CSMs 1314, 1324 instantiated within each network slice. The CSM function is further configured to track charging across all network slices.

The infrastructure management (IM) 1336 function is configured to perform infrastructure sharing, such as sharing spectrum using a spectrum broker.

The data analytics (DA) function 1338 is configured to collect statistics across multiple network slices.

The cache and forward (CF) function 1340 is configured to manage cached content across all network slices.

Figure 14A:
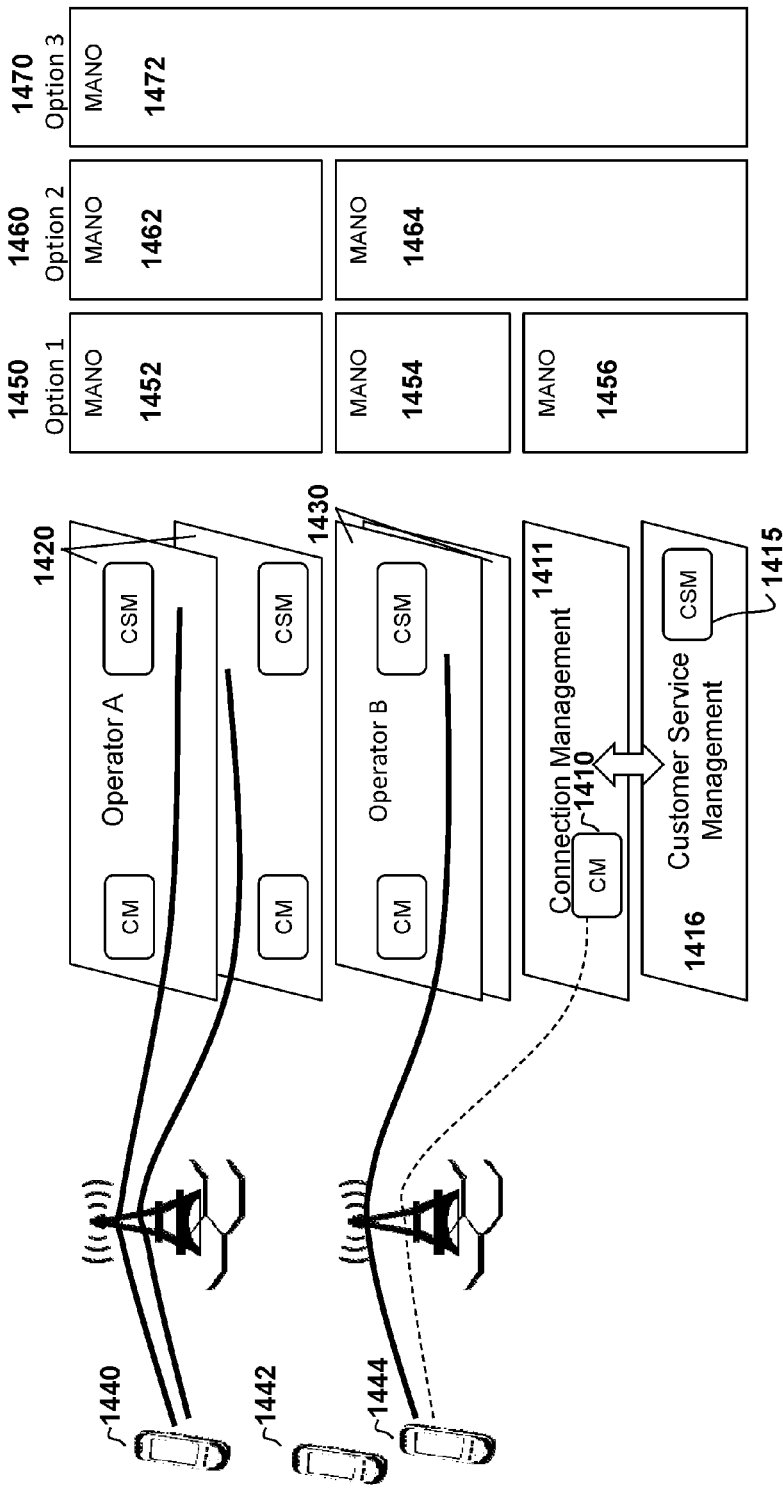
FIG. 14A illustrates a network slicing configuration including instantiation of CM and CSM management plane functions in accordance with an embodiment of the present invention.

FIG. 14A illustrates a network slicing configuration including instantiation of a management plane CM function 1410 and a management plane CSM function 1415 in accordance with an embodiment of the present invention. The management plane CM and CSM functions are instantiated as and/or within separate management planes 1411, 1416. Different network slices may be associated with different operators. A first operator, Operator A, may be associated with a first set of network slices 1420, and a second operator, Operator B, may be associated with a second set of network slices 1430. Different UEs 1440, 1442, 1444 may be associated with one or more different network slices.

Figure 14B:
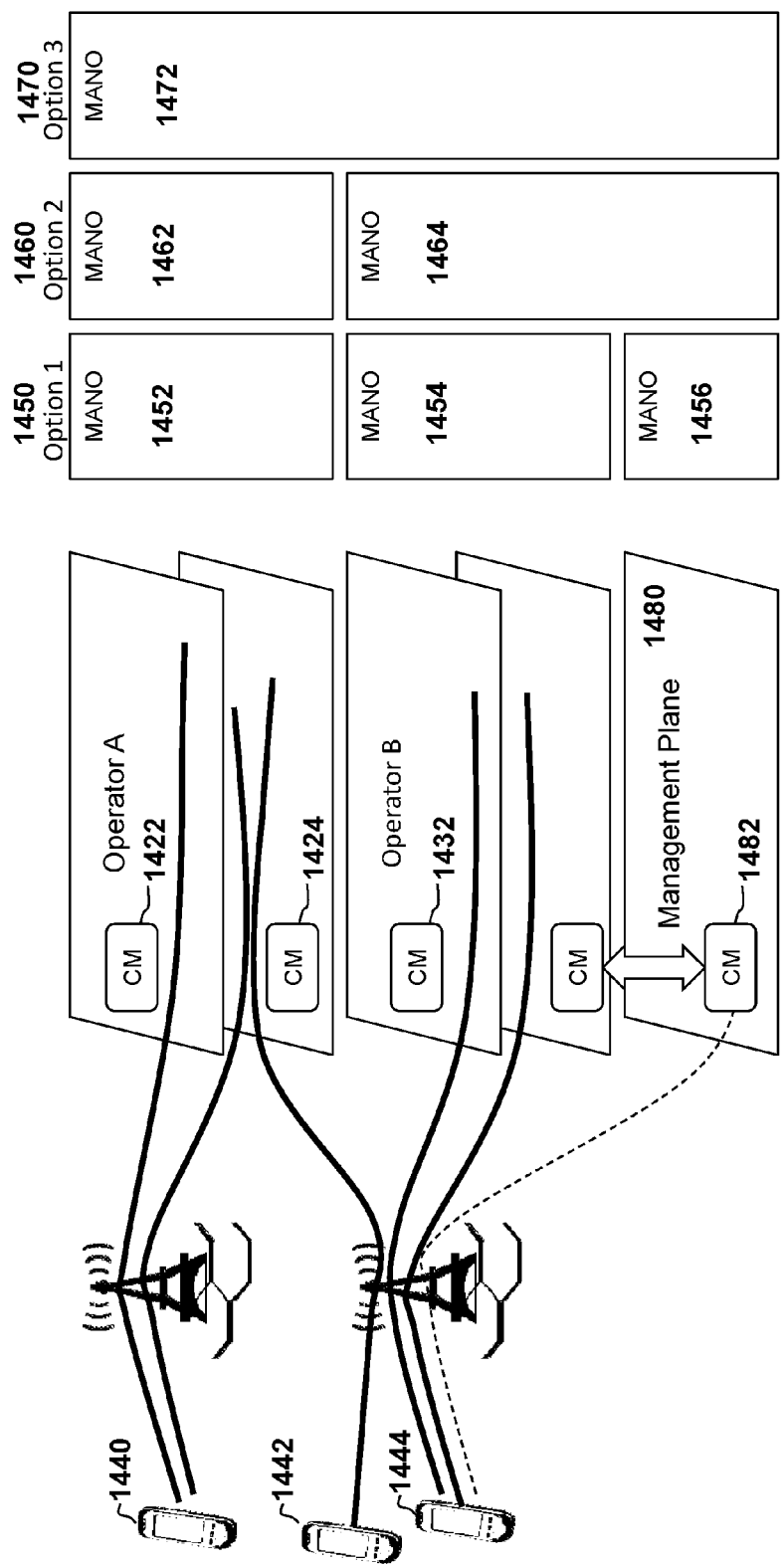
FIG. 14B illustrates a network slicing configuration including instantiation of connection management functions, in accordance with an embodiment of the present invention.
Figure 14C:
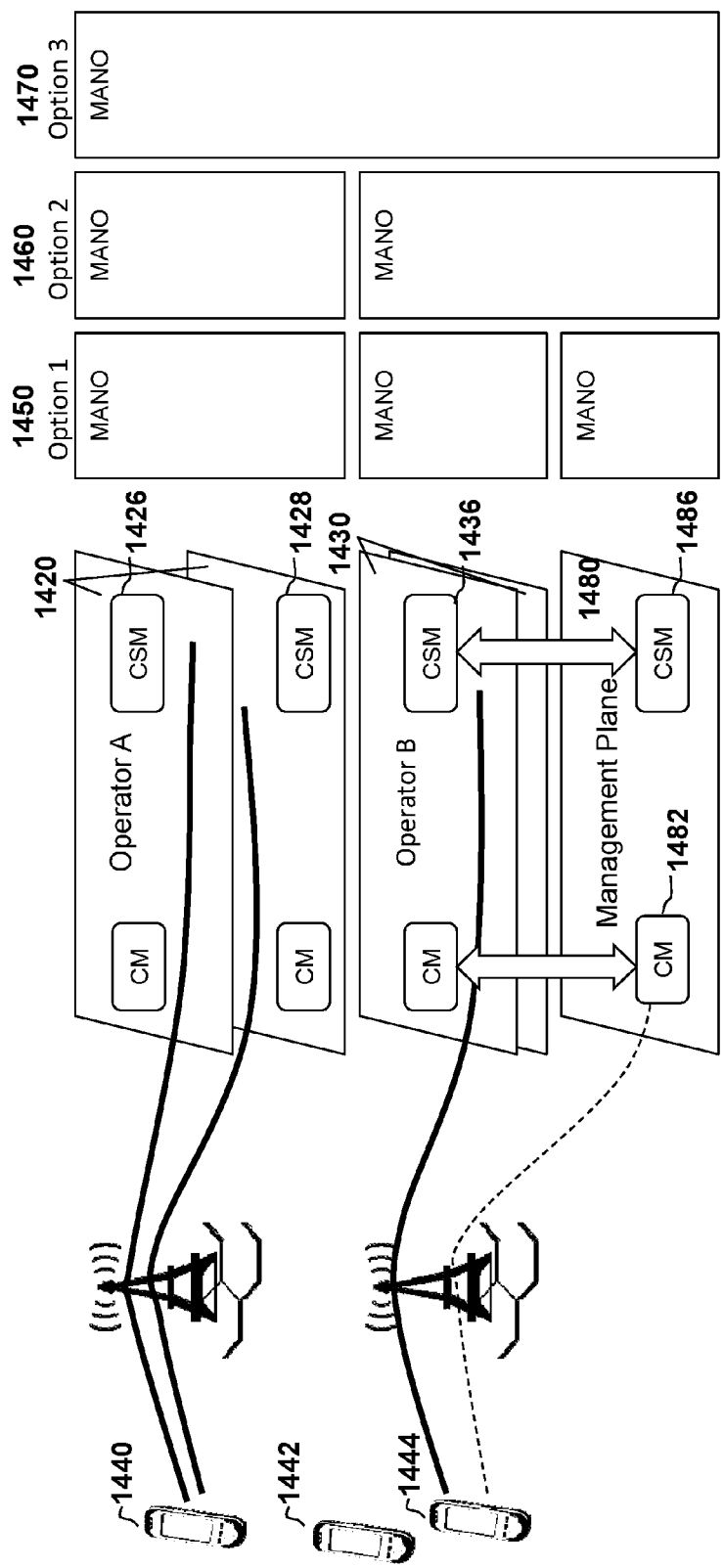
FIG. 14C illustrates a network slicing configuration including instantiation of customer service management functions, in accordance with an embodiment of the present invention.

FIGS. 14A to 14C illustrate different network architectures according to different embodiments of the present invention. For each network architecture, three different options are illustrated for how a MANO entity can be established to serve the network slices. In Option 1 1450, for each of FIGS. 14A to 14C, different MANO entities 1452, 1454 are established for each different operator, and another MANO entity 1456 is established for the management plane. In Option 2 1460, each operator is served by a unique MANO entity 1462, 1464, and one of the MANO entities 1464 associated with an operator also serves the management planes. In Option 3 1470, all operators and the management planes are served by a single MANO entity 1472. Differences in the architectures shown in FIGS. 14A to 14C relate to how the resources of different operators can be interconnected with each other and with a CSM management plane. One or more MANO entities may be established, each of the MANO entities supporting one or more of the network slices, including management plane network slices. In various embodiments, each network slice is supported by a single MANO entity.

In various embodiments, each MANO entity is responsible for lifecycle management of the network services instantiated within its administrative domain.

FIG. 14B illustrates a network slicing configuration particularly showing instantiation of connection management functions, including a management-plane connection management (MP-CM) function 1482 residing in a management plane 1480 which may operate as described below.

The MP-CM function 1482 may handle connection management across multiple network slices. Separate service-specific CM virtual network functions (VNFs) 1422, 1424, 1432 may be instantiated within each network slice to handle the service specific connection management. Global connection management aspects may be handled by the MP-CM function 1482 and service-specific connection management aspects may be handled by the service-specific CM 1422, 1424, 1432 within the network slice.

In various embodiments, lifecycle management of the management plane functions can be handled by the MANO, for example as owned by the infrastructure provider or an operator. The operator may allow a Virtual Network Operator such as a Mobile Virtual Network Operator (MVNO) to manage its own network slices with its own MANO. Alternatively the operator may manage the MVNO network slices itself.

In some embodiments, the Mobile Broadband (MBB) network slice can be used to handle initial access for all devices instead of the management plane.

FIG. 14B also illustrates various examples of associations between UEs 1440, 1442, 1444 and network slices. A UE 1440, 1444 may be associated with plural network slices.

In embodiments of the present invention, the MP-CM function can be a VNF instantiated within the management plane. Alternatively, the MP-CM function can be a separate connection management layer which is instantiated as a separate network slice. The lifecycle management of the MP-CM may be performed by the management and orchestration (MANO) entity. For example, the MP-CM may be instantiated by the MANO, and may be scaled in/out by the MANO as needed, for example as new network slices are instantiated or terminated.

In some embodiments, the MP-CM may perform one or more of the following functions: determining where to forward attach requests; keeping track of the network slices that have been instantiated; subscription management for Machine-Type-Communication (MTC) and/or Internet of Things (IoT) devices that may be capable of associating with multiple operators; and connection management for each network slice during roaming. Connection management may include assigning a UE to a different network slice when the UE roams outside the coverage area of a network slice.

In some embodiments, the MP-CM may be configured to keep track of associations between UEs and network slices. The service-specific CM within each network slice may be a service-specific VNF, such as a virtual service-specific connection manager (v-s-CM).

The MP-CM and set of service-specific CMs may be configured to cooperatively or independently provide connection management for the various network slices by an appropriate division of tasks.

In some embodiments, the v-s-CM VNF is configured to keep track of a UE's relative location. For example, the UE's relative location may be the serving eNB if the UE is in CONNECTED mode, or the tracking area if the UE is in IDLE mode. The v-s-CM VNF may be configured to perform an authentication procedure with the HSS, which may be a service-specific HSS containing a list of the IDs of the UEs that are authorized to use the associated network slice (NS). The v-s-CM VNF may be configured to send the attach response message along with the security and ciphering options to the device, for example via the serving eNB.

In some embodiments, the lifecycle management of the CM VNF is performed by the VNF Manager (VNFM).

In some embodiments, the CM includes an element manager (EM), such as defined in various 3GPP specifications, which may be part of the VNF or provided as a separate function. The EM may be configured for managing network elements as would be readily understood by a worker skilled in the art In some embodiments, the CM may transmit performance metrics to either the EM or the VNFM. The performance metrics may be used to trigger a lifecycle management operation such as a scale in/out of supporting virtual infrastructure related to the service.

FIG. 14C illustrates a network slicing configuration similar to FIG. 14B, except that the customer service management (CSM) function is explicitly illustrated. In particular, the management plane 1480 includes both the MP-CM 1482 and a MP-CSM 1486, and the various network slices 1420, 1430 also include service-specific CSM functions 1426, 1428, 1436. The CSM function may operate as described below.

Generally, the MP-CSM 1486 manages the charging and QoS requirements across multiple network slices. Further, the service-specific CSM functions, 1426, 1428, 1436 can be instantiated within each corresponding network slice to handle charging and QoS for that network slice. The MP-CSM 1486 may be a VNF which may be instantiated within the management plane layer 1480. Alternatively, the management plane customer service management (CSM) layer may be instantiated as a separate network slice by the MANO.

The lifecycle management of the MP-CSM or CSM layer may be performed by the management and orchestration (MANO) entity. The MP-CSM or CSM layer may be instantiated by the MANO, and may be scaled in/out by the MANO as needed, for example as new network slices are instantiated or terminated.

Various functionalities of the MP-CSM are as follows. It will be readily understood that other functionalities may be present. The MP-CSM may be configured to handle the charging for various devices across all the network slices. The MP-CSM may be configured to communicate with the service specific CSM functions to determine the overall billing for each device or group of devices in the case of MTC/IoT. The MP-CSM may be configured to ensure that the QoE can be met for each UE per network slice, for example before that UE is admitted. The MP-CSM may be configured to communicate with the CM function to establish the management of the per user billing for the combined network slices. The MP-CSM may be configured to provide subscription management for MTC/IoT devices that may be capable of associating with multiple operators. Alternatively, subscription management may be performed by the MP-CM.

In various embodiments, the service-specific CSM function within a given network slice may be a service-specific VNF, such as a virtual service-specific customer service manager (v-s-CSM). It is noted that different network slices may have different service-specific CSMs.

In various embodiments, each v-s-CSM is configured to handle the service specific charging for one or more specified UEs, for example in association with a given network slice. The charging may depend on various factors. For example, charging may depend on the QoS requested by the UE, the loading in the network, the time of day, or a combination thereof. In some embodiments, the v-s-CSM may communicate with the service specific SGW (v-s-SGW) to determine the amount of traffic sent and/or received by the subject UE. In some embodiments, the v-s-CSM may communicate with other entities to update the parameters used to evaluate the cost of providing the service to the UE. For example, the cost may increase if the loading in the network increases.

In some embodiments, the lifecycle management of the CSM VNF is performed by the VNF Manager (VNFM).

In some embodiments, the CSM may also have an Element Manager (EM), which may be a part of the VNF or provided as a separate function.

In some embodiments, the CSM may send performance metrics to either the EM or the VNFM. The performance metrics may be used to trigger a lifecycle management operation such as a scale in/out of supporting virtual infrastructure related to the service.

As will be readily understood in view of the above, the MP-CSM and set of service-specific CSMs may be configured to cooperatively or independently provide customer service management for the various network slices by an appropriate division of tasks.

Infrastructure Management

Embodiments of the present invention relate to infrastructure management in a communication network supporting a plurality of network slices, as described below.

In various embodiments comprising infrastructure management, a spectrum broker manages spectrum sharing between plural network operators in association with a radio access network portion of the communication network. The spectrum sharing comprises negotiation between the spectrum broker and the plurality of network operators. The spectrum broker may allocate resources to the plurality of network operators or to the plurality of network slices. A spectrum negotiator function may be provided and configured to negotiate with the spectrum broker to request allocation of spectrum resources, for example on behalf of network operators or other entities requiring resources.

Figure 15:
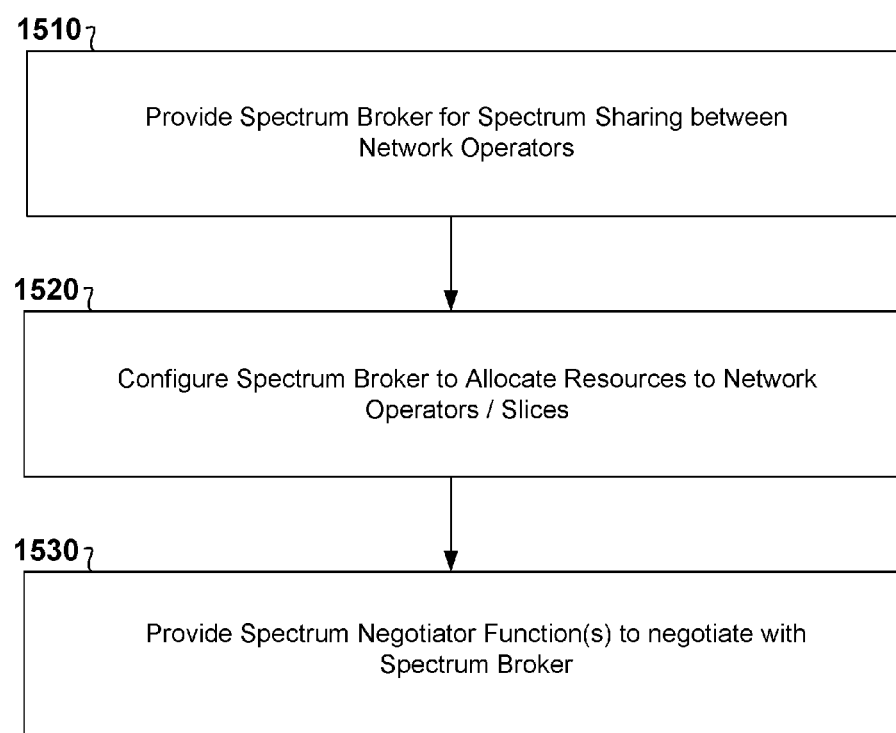
FIG. 15 illustrates a method for managing infrastructure in a communication network supporting a plurality of network slices and supported by a plurality of network operators and/or infrastructure providers, in accordance with an embodiment of the present invention.

In view of the above, and with reference to FIG. 15 embodiments of the present invention provide for a method for managing infrastructure in a communication network supporting a plurality of network slices and supported by a plurality of network operators and/or infrastructure providers. The method includes providing 1510 a spectrum broker configured to facilitate spectrum sharing between the plurality of network operators in association with a radio access network portion of the communication network. The spectrum sharing includes negotiation between the spectrum broker and the network operators. The method further optionally includes configuring 1520 the spectrum broker to allocate resources to the network operators or to the network slices. The method further optionally includes providing 1530 at least one spectrum negotiator function configured to negotiate with the spectrum broker to request allocation of spectral resources.

Figure 16:
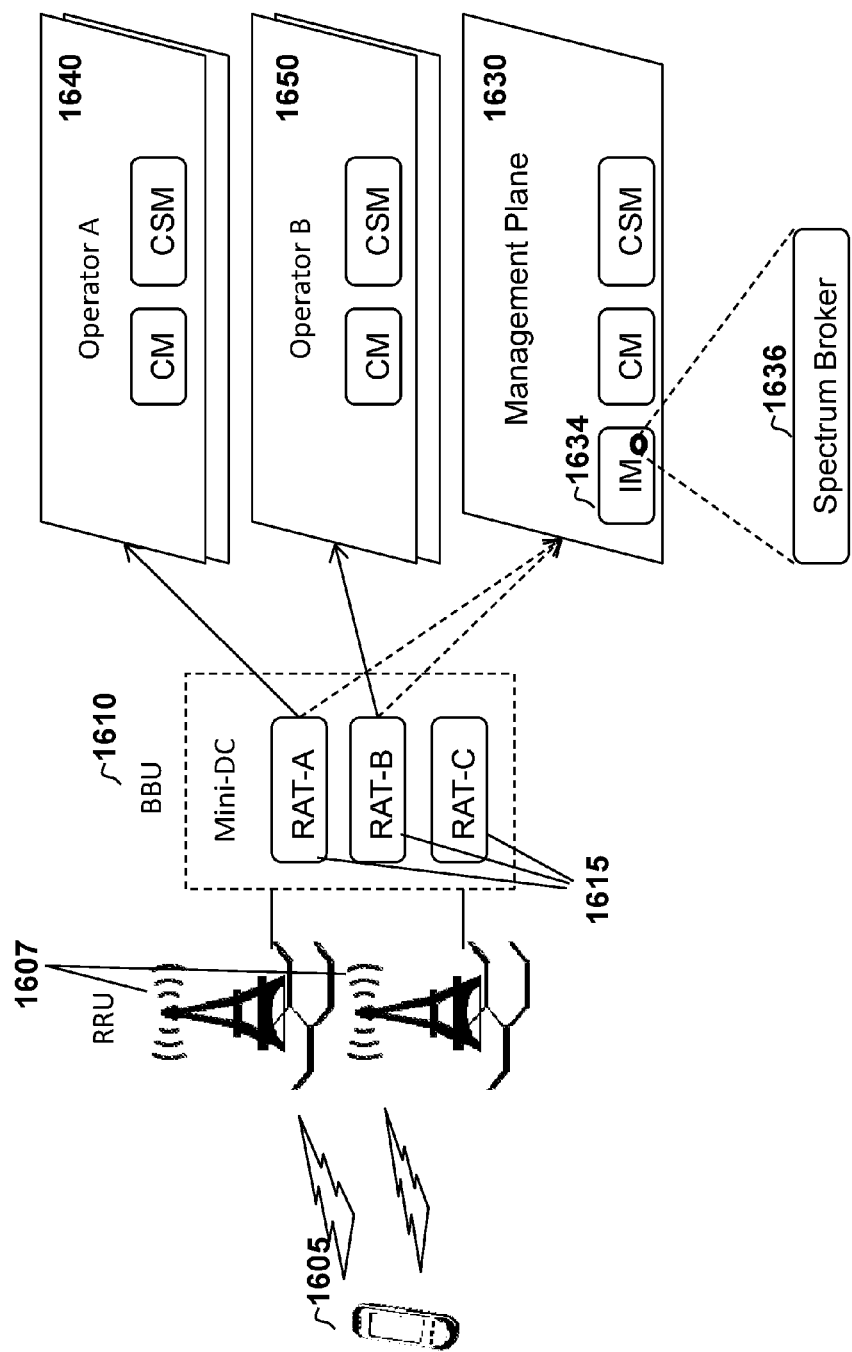
FIG. 16 illustrates a network configuration illustrative of infrastructure management in accordance with some embodiments of the present invention.

FIG. 16 illustrates a network configuration including infrastructure management in accordance with some embodiments of the present invention. The UE 1605 may be capable of communication on multiple carriers and/or multiple Radio Access Technologies (RATs) 1615. The carriers may be owned by different operators. Further, various network slices may span across multiple infrastructure providers. A connection manager (CM) 532 in the management plane 530 is provided and configured to keep track of the UE's subscription preferences and/or to provide the forwarding policy to the CMs in the network slices that are serving the UE.

In some embodiments, a spectrum broker (SB) 1636 can be instantiated to enable use of spectrum by multiple operators, for example opportunistically. The spectrum broker can be a part of the infrastructure management (IM) entity 1634 for example as located in the management plane 1630.

In more detail, as illustrated in FIG. 16, a UE may communicate with one or more Remote Radio Units (RRU) 1607 which are coupled to a given Baseband Unit (BBU) 1610 supporting the plurality of RATs 1615. The RATs in turn may be operatively coupled to plural network slices, for example network slices 1640, 1650 belonging to different operators and/or associated with the management plane 1630. Those skilled in the art will appreciate that in some instances, a single unit will have both the RRU and the BBU, while in other instances, the RRU is separate from the BBU. Context is sufficient for those skilled in the art to make such a determination.

Figure 17:
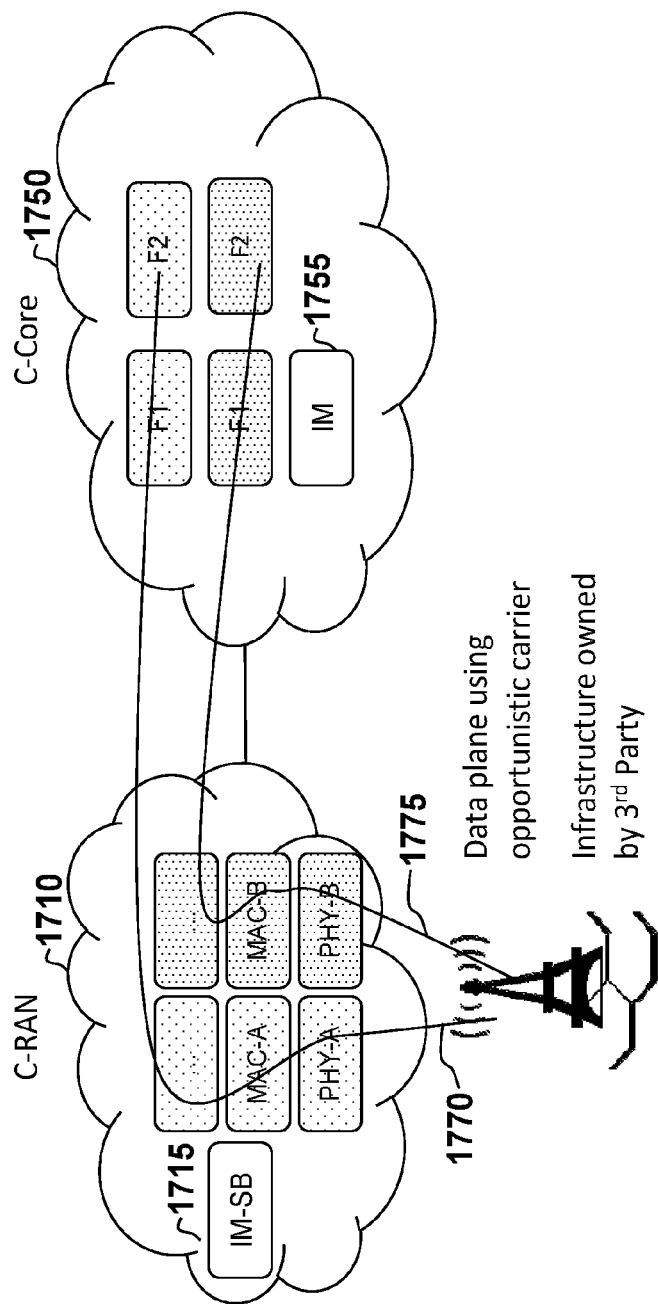
FIG. 17 also illustrates a network configuration illustrative of infrastructure management in accordance with some embodiments of the present invention.

FIG. 17 illustrates a network configuration including infrastructure management in accordance with an embodiment of the present invention. In this embodiment, the infrastructure may be owned by a third party, and the data plane may utilize an opportunistic carrier.

In relation to FIG. 17, the IM entity can be used to facilitate spectrum sharing, such as via Time-Division Multiplexing (TDM) or Frequency-Division Multiplexing (FDM) or related multi-access spectrum sharing. An infrastructure management spectrum broker (IM-SB) entity 1715 is provided in the C-RAN 1710 for this purpose. Each operator has its own anchor carrier, which may be used for the control plane. Further, the opportunistic carrier, which is obtained by negotiating with the spectrum broker, may be used for the data plane. In some embodiments, the spectrum broker is an infrastructure management function that does not belong to any VIM, but rather is owned by a 3$^{rd}$ party infrastructure provider.

Further in relation to FIG. 17, each operator instantiates its own VNFs for both the C-RAN 1710 and the C-Core 1750. In addition, an infrastructure manager (IM) 1755 may be included in the cloud for the core network functions (C-Core) to obtain new resources for the core network functions. The two paths 1770, 1775 illustrated in FIG. 17 correspond to two different connection routes for use by different network slices. Data from different UEs will follow a path defined by the network slice that the UE is using. The sparsely dotted blocks correspond to radio access and core resources of one operator or set of operators and/or infrastructure providers and/or to radio access and core resources associated with a first network slice. The densely dotted blocks correspond to radio access and core resources of another operator or set of operators and/or infrastructure providers and/or to radio access and core resources associated with a second network slice. For two network slices making use of the same physical resources, the resources can be partitioned to ensure that each slice is provided with an adequate resource base. For moderately to highly constrained resources, such as radio links, network slices can be allocated through the use of multiplexing, such as a TDM or FDM technique.

In more detail, in Time Division Multiplexing (TDM) spectrum sharing, the entire carrier may be used by the same operator for the duration allocated by the spectrum broker. In Frequency Division Multiplexing (FDM) spectrum sharing, the carrier may be sub-divided, with each operator being allocated a portion of the carrier, and the broker being configured to dynamically change the amount of resources allocated to the different operators.

In some embodiments, the spectrum broker 1715 may be configured to allocate resources to different network slices rather than different operators.

In some embodiments, a virtual service-specific infrastructure management (v-s-IM) VNF may be instantiated within multiple network slices. The IM, such as the v-s-IM, within a given network slice may then be configured to negotiate with the spectrum broker.

Figure 18:
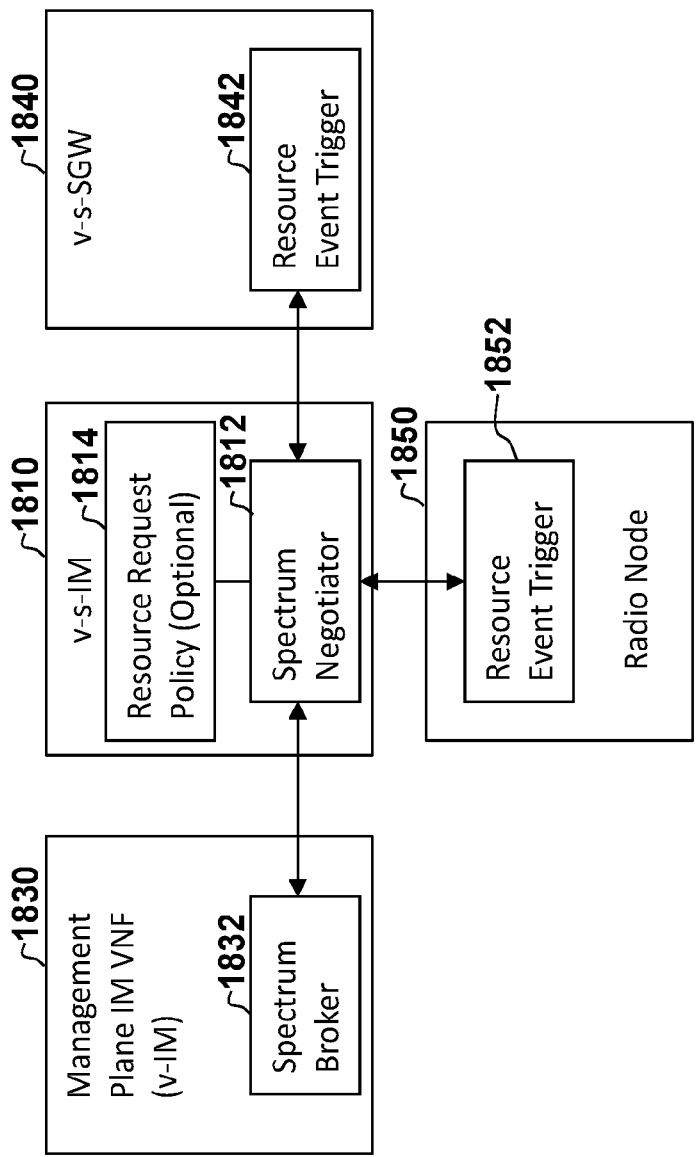
FIG. 18 illustrates configuration of the v-s-IM, as configured to negotiate with the spectrum broker, and the relationship of the v-s-IM with other functions, in accordance with an embodiment of the present invention.

FIG. 18 illustrates configuration of the v-s-IM 1810, as configured to negotiate with the spectrum broker 1832, and the relationship of the v-s-IM with other functions, in accordance with an embodiment of the present invention.

Having regard to FIG. 18, the illustrated v-s-IM VNF 1810 includes a spectrum negotiator function 1812 and optionally a resource request policy function 1814. The spectrum negotiator function 1812 is configured to request spectrum resources from the spectrum broker 1832 residing in the management plane infrastructure management function 1830. The spectrum negotiator may be responsive to a request for more spectrum from the virtual service-specific Serving Gateway (v-s-SGW) 1840 or a Radio Node 1850 when a resource request event is triggered by a resource event trigger 1842, 1852. The resource request event may be enabled when the virtual infrastructure manager (VIM) can no longer perform the scale up or scale out operation due to lack of resources. Those skilled in the art will appreciate that the VIM may be designed to satisfy the requirements specified in the ETSI NFV structure. The spectrum negotiator may be configured to consult the resource request policy function, when provided. The resource request policy function may either be a part of the spectrum negotiator or a separate function within the v-s-IM. Alternatively, the resource request policy function may be provided as a separate VNF.

Figure 19:
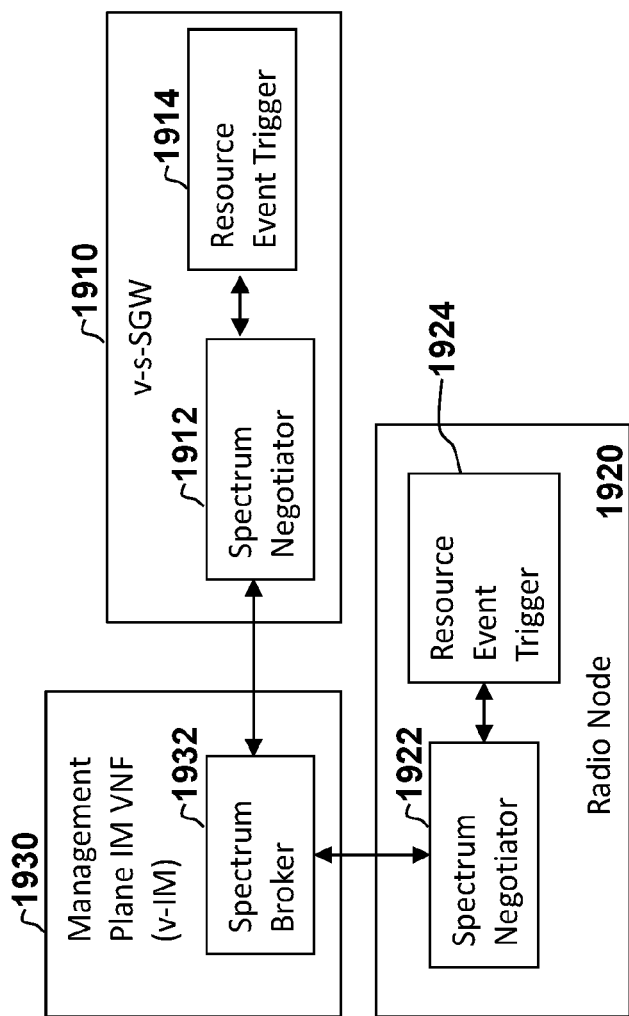
FIG. 19 illustrates a spectrum negotiator function in relation with other functions, in accordance with another embodiment of the present invention.

FIG. 19 illustrates a spectrum negotiator function 1912, 1922 in relation with other functions, in accordance with an alternative embodiment of the present invention. In the embodiment of FIG. 19, the spectrum negotiator 1912, 1922 can be a function of the v-s-SGW 1910 and/or the radio node 1920 rather than being provided as a separate IM entity of a network slice. In operation, a resource event trigger 1914, 1924 is transmitted to the spectrum negotiator. Both functions can be co-located on the same NFVI node or they can be instantiated on separate network nodes as component functions. In some embodiments corresponding to the configuration of FIG. 19, the different network nodes may use a different resource request policy for performing the negotiation function, which may be internal to each network node or as a separate VNF. Negotiation comprises communicating with the spectrum broker 1932 in the management plane IM VNF 1930.

End-to-End Service Management

Potentially separately or in association with network slice association, embodiments of the present invention provide for end-to-end service management, as described below.

Figure 20:
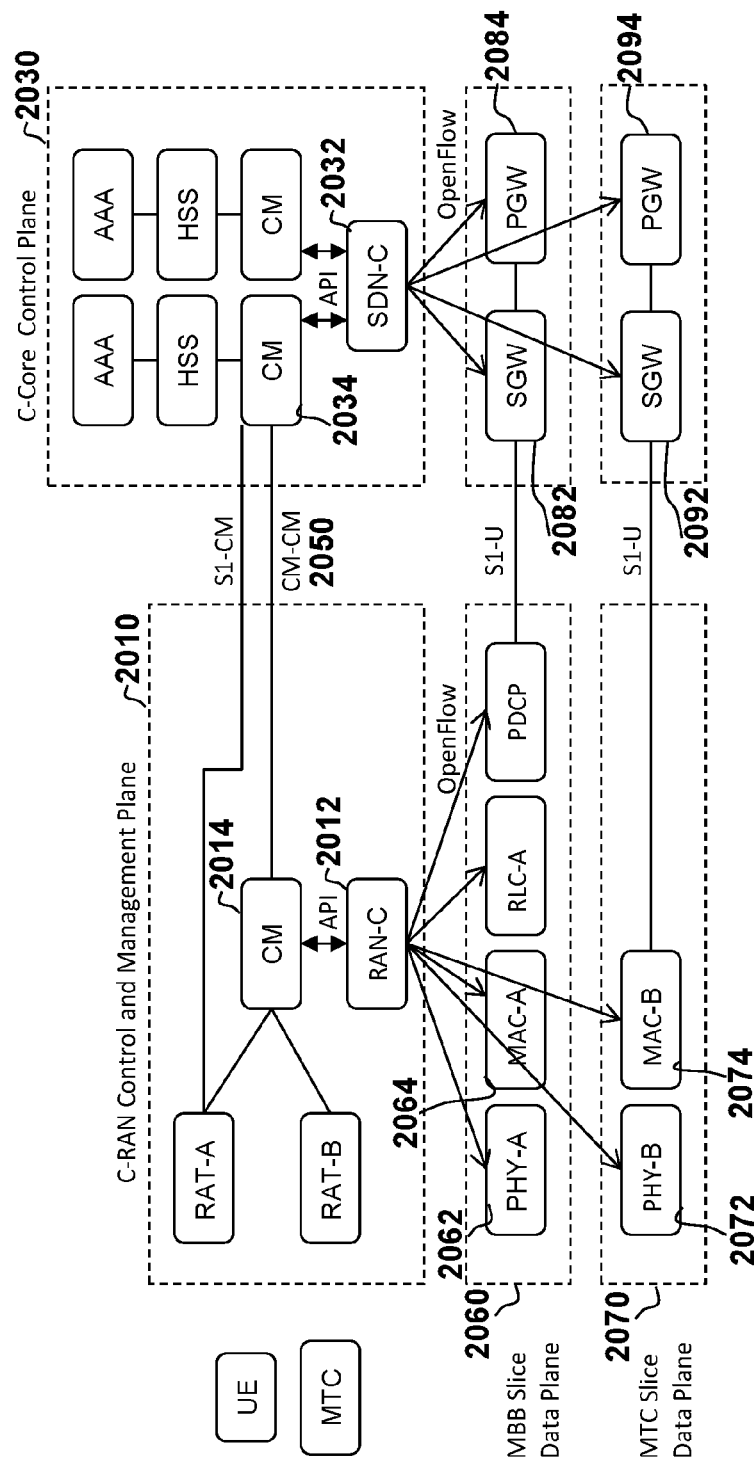
FIG. 20 illustrates end-to-end service management using Software Defined Networking (SDN), in accordance with embodiments of the present invention.

FIG. 20 illustrates end-to-end service management using software defined networking (SDN), in accordance with embodiments of the present invention. As illustrated, an SDN controller may be instantiated in the C-RAN 2010 and/or the C-Core 2030. The SDN controller is denoted as RAN-C 2012 in the C-RAN and as SDN-C 2032 in the C-Core. The RAN-C provides the forwarding rules for the RAN functions. Different RAN functions can be included in different network slices. Additionally, an SDP may determine the access protocol stack for each network slice before the network slice is instantiated by the MANO. The SDN-C 2032 is the SDN controller for the core network elements. In embodiments, the different network slices can have different network functions.

Also illustrated in FIG. 20 is a CM-CM interface 2050 defined between the CM 2014 of the C-RAN control and management plane (MP-CM) and the CM 2034 of the C-Core Control Plane (CP-CM).

In more detail with respect to FIG. 20, a data plane 2060 corresponding to a MBB network slice and a data plane 2070 corresponding to a MTC network slice are illustrated. The RAN-C SDN controller 2012 in the C-RAN 2010 manages radio-access-related functions in each of these slices 2060, 2070, such as the physical layer functions 2062, 2072, MAC layer functions 2064, 2074, and the like. The SDN-C SDN controller 2032 in the C-Core 2030 manages core related functions in each of these slices, such as the serving gateway 2082, 2092 and packet gateway 2084, 2094 functions. Each of these functions may comprise virtual network functions, for example.

Figure 21:
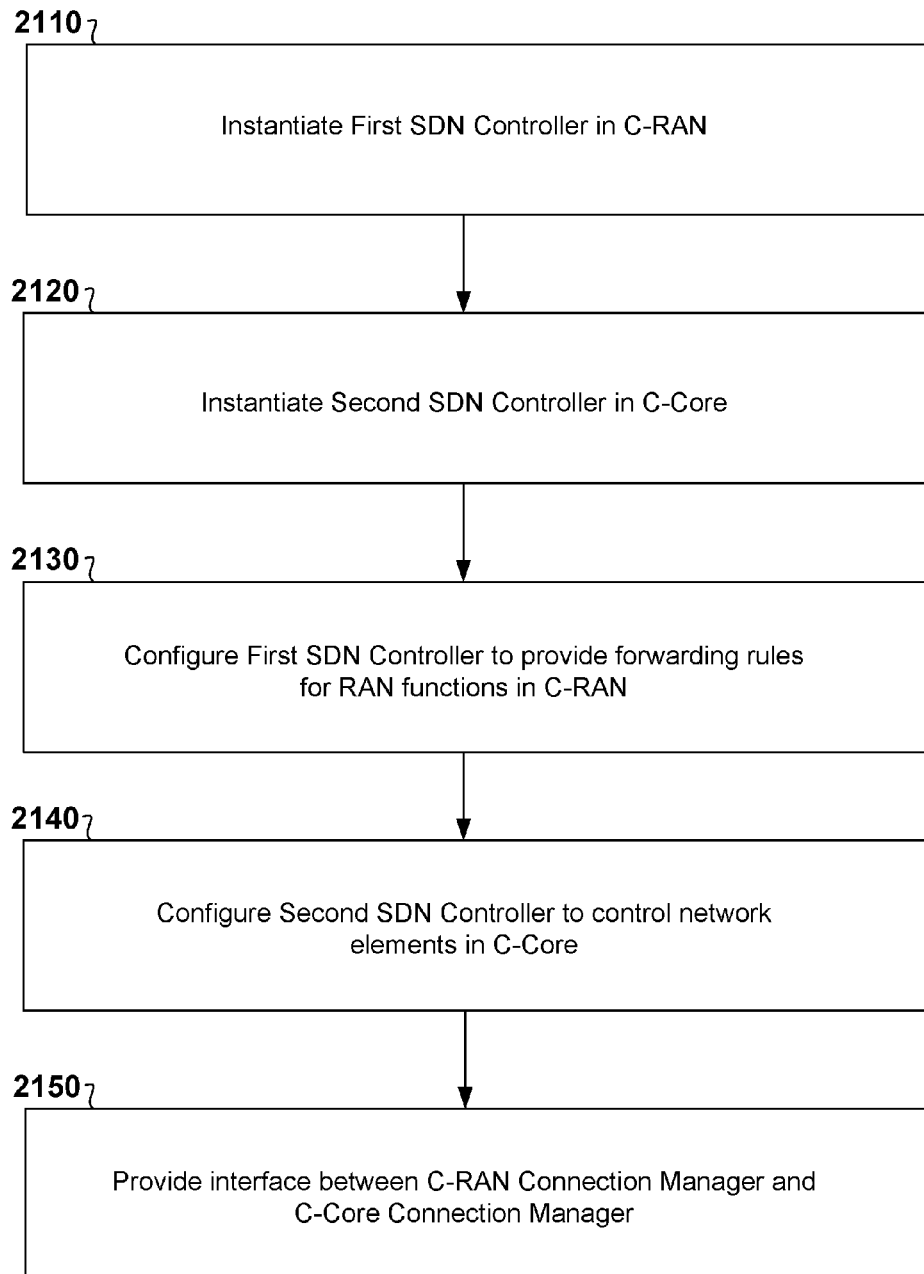
FIG. 21 illustrates a method for end-to-end service management in an SDN-capable communication network supporting a plurality of network slices, in accordance with embodiments of the present invention.

In view of the above, and with reference to FIG. 21, embodiments of the present invention provide a method for end-to-end service management in an SDN-capable communication network supporting a plurality of network slices. The method includes instantiating 2110 a first SDN controller in a C-RAN of the network. The method further includes instantiating 2120 a second SDN controller in a C-Core of the network. The method further includes configuring 2130 the first SDN controller to provide forwarding rules for RAN functions in the C-RAN. The method further includes configuring 2140 the second SDN controller to control network elements in the C-Core. The method further includes providing 2150 an interface between a first connection manager in the C-RAN and a second connection manager in the C-Core, the first connection manager operatively coupled to the first SDN controller and the second connection manager operatively coupled to the second SDN controller.

In embodiments of the present invention, software defined networking (SDN) corresponds to an architectural framework for creating intelligent programmable networks, where the control planes and the data planes are decoupled, network intelligence and state are logically centralized, and the underlying network infrastructure is abstracted from the application. In embodiments of the present invention, an orchestrator function may use customer information and provide information to form a network logical topology, for example as created via the software defined topology (SDT) function. The SDT function can be combined with the SDN and software defined protocol (SDP) functions to create a customized virtual network, wherein a virtual network is a collection of resources virtualized for a particular service.

In some embodiments, SDN allows for the management of network services through abstraction of lower-level functionality. Control functions may be separated from forwarding functions for example by controlling the forwarding nodes from a control element. NFV can facilitate the virtualization of entire classes of network node functions. A VNF can comprise or operate on one or more virtual machines running on relatively generic servers or computing equipment, such as commercial off-the-shelf hardware capable of being configured to provide a variety of functionalities, as opposed to dedicated hardware for a given functionality.

Various embodiments of the present invention, for example with respect to the above-described network slice association process, may be used to provide for flexibility in the instantiation of the management plane functions and the control plane. In some embodiments, and subject to other limitations that may arise, both the management plane functions and the control plane can be instantiated substantially anywhere in the network by the management and orchestration (MANO) entity to manage the connection management across all the network slices. In some embodiments, determining the locations of the functions can depend on the delay requirement of the different network services. In some embodiments, the global and/or service-specific connection management functions can be located at the network edge at least in locations where there are devices that require fast access.

Hardware and Implementation

Figure 22:
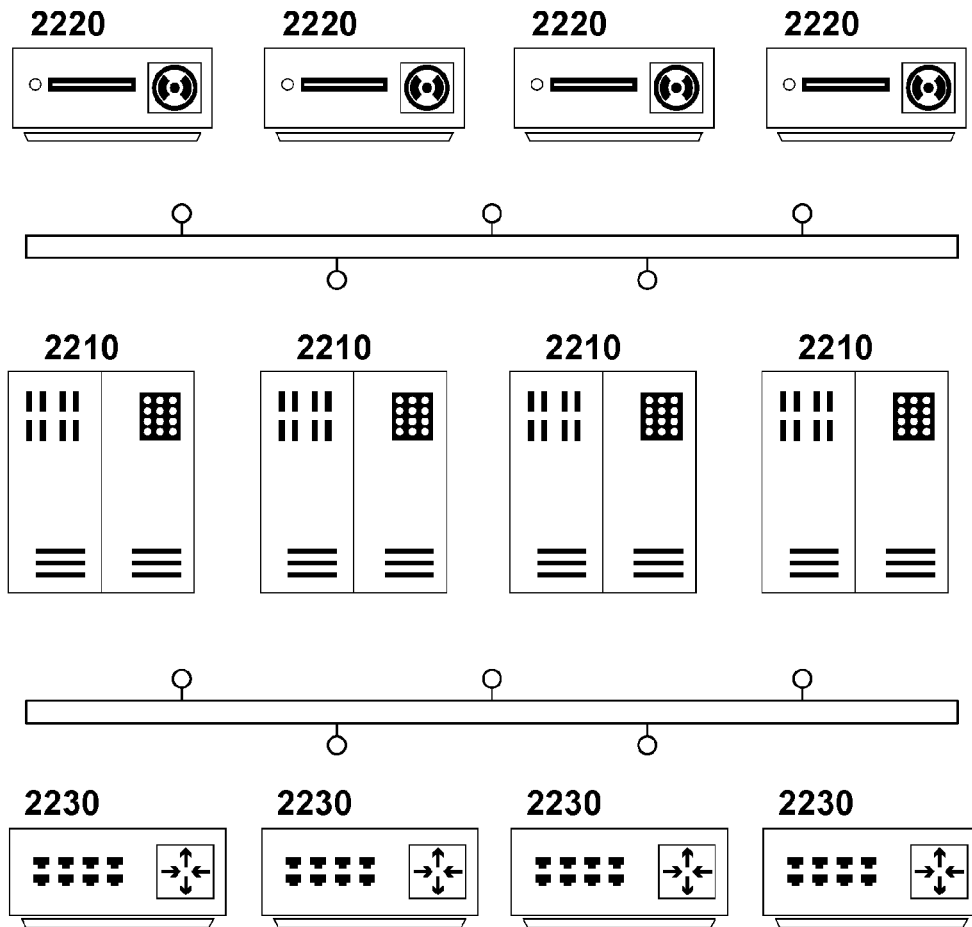
FIG. 22 illustrates an apparatus provided in accordance with embodiments of the present invention.

Some embodiments of the present invention are implemented using computing devices such as servers or collections of servers, capable of high-speed communication with other devices in the network infrastructure. Such computing devices may correspond to infrastructure devices of the communication network. Computing devices may be dedicated to a particular function, or provide a platform for supporting virtualized functions. FIG. 22 illustrates a collection of standard servers 2210, data storage units 2220, and network communication components 2230 such as network interfaces and/or switches, which are provided in accordance with embodiments of the present invention. The components may be co-located, geographically distributed, or a combination thereof. The microprocessors of the computing devices, operatively coupled to memory such as server memory and/or data storage unit memory, and the network communication components may be configured to instantiate and execute the various functions, modules, interactions therebetween, and the like, as described herein. Functions may be instantiated at an appropriate network and/or geographic location, and may be moved as required. An apparatus according to embodiments of the present invention may comprise the microprocessors, memory and network communication components configured to perform one or more functions as described herein.

It will be readily understood that, throughout the preceding discussion, the above-described network functionalities and operations may correspond to a method for use in supporting operation of a communication network, such as a $5^{th}$ generation wireless communication network. The method may involve computer-implemented functions, namely functions which are implemented by one or more computing, communication and/or memory devices of the network infrastructure. Further, it will be readily understood that embodiments of the present invention relate to a communication network system or associated apparatus thereof, which is configured to perform the above-described network functionalities and operations. Again, the system or apparatus may comprise one or more computing, communication and/or memory devices of the network infrastructure.

Embodiments of the present invention may be implemented using specific servers or general-purpose computing, communication and/or memory devices which are configured to provide the required functionality through virtualization technologies. Devices may include other hardware such as Application Specific Integrated Circuits, microcontrollers, and digital logic circuits. The method may involve the operation of one or more network components in order to improve the operation of the network. As such, with the communication network viewed as an apparatus, embodiments of the present invention may be directed to improving internal operations of the communication network.

Embodiments of the present invention may be implemented using one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Computing devices may utilize, at a hardware level, a set of one or more microprocessors operatively coupled to a corresponding set of memory components which include stored program instructions for execution by the microprocessors. Computing devices may be used to provide virtual computing resources at one or more levels of virtualization. For example, one or more given generic computer hardware platforms may be used to provide one or more virtual computing machines. Computing devices, such as processor resources, memory, and the like, may also be virtualized in order to provide resources from which further virtual computing machines are built. A set of computing devices which are allocatable for providing various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method, in a communication network supporting a plurality of network slices, for association of a mobile device, the method comprising:
   receiving, by a connection manager, an indication that the mobile device is to be associated with the communication network;
   correlating an identifier of the mobile device, received in an attach request carried by the indication, with an identifier associated with a network slice; and
   transmitting instructions, from the connection manager to at least one node of the communication network, to associate the mobile device with the network slice correlated to the identifier of the mobile device.

2. The method of claim 1, further comprising determining, by the connection manager, the network slice out of the plurality of network slices.

3. The method of claim 1, wherein the connection manager is instantiated in a core portion of the communication network separate from access nodes of the communication network.

4. The method of claim 1, further comprising selecting, by the connection manager, a local connection manager corresponding to the network slice.

5. The method of claim 1, wherein the instructions include an instruction transmitted to a local connection manager to associate the mobile device with the network slice.

6. The method of claim 1, wherein the connection manager is separate from an access node of the communication network, and wherein the indication is transmitted from the mobile device to the access node and forwarded from the access node to the connection manager.

7. The method of claim 1, wherein: the connection manager is separate from an access node of the communication network; the indication is transmitted from the mobile device to the access node and forwarded from the access node to the connection manager; and the instructions include an instruction transmitted to the access node and instructing the access node to select a local connection manager corresponding to the network slice and to transmit a further instruction to the local connection manager to associate the mobile device with the network slice.

8. The method of claim 1, wherein the connection manager is integrated with an access node to which the mobile device communicates; or the connection manager is instantiated at an edge of the communication network, or both.

9. The method of claim 1, wherein associating the mobile device with the network slice includes one or more of: authenticating the mobile device; authenticating the network slice to the mobile device; confirming the mobile device is authorized to access the network slice; admitting the mobile device to the network slice; establishing signaling and data bearers for the mobile device; establishing network forwarding rules supporting the mobile device; performing a path computation operation using a flow manager entity in the communication network; performing a path configuration operation by the flow manager entity; and transmitting an attach response to the mobile device indicative that association of the mobile device with the network slice has been performed.

10. The method of claim 1, wherein the identifier is provided to the mobile device via: a broadcast channel; a unicast message; a multicast message; or pre-programming in the mobile device.

11. The method of claim 1, wherein the connection manager is instantiated in a management plane separate from the plurality of network slices.

12. A connection manager apparatus in a communication network supporting a plurality of network slices, the apparatus comprising a microprocessor operatively coupled to a network interface and configured to:
   receive an indication that the mobile device is to be associated with the communication network;
   correlate an identifier of the mobile device, received in an attach request carried by the indication, with an identifier associated with a network slice; and
   transmit instructions, from the connection manager to at least one node of the communication network, to associate the mobile device with the network slice correlated to the identifier of the mobile device.

13. The apparatus of claim 12, further configured to determine the network slice out of the plurality of network slices.

14. The apparatus of claim 12, wherein the apparatus is instantiated in a core portion of the communication network separate from access nodes of the communication network.

15. The apparatus of claim 12, further configured to select a local connection manager corresponding to the network slice.

16. The apparatus of claim 15, wherein the instructions include an instruction transmitted to the local connection manager to associate the mobile device with the network slice.

17. The apparatus of claim 12, wherein the apparatus is separate from an access node of the communication network, and wherein the indication is transmitted from the mobile device to the access node and forwarded from the access node to the apparatus.

18. The apparatus of claim 12, wherein: the apparatus is separate from an access node of the communication network; the indication is transmitted from the mobile device to the access node and forwarded from the access node to the apparatus; and the instructions include an instruction transmitted to the access node and instructing the access node to select a local connection manager corresponding to the network slice and to transmit a further instruction to the local connection manager to associate the mobile device with the network slice.

19. The apparatus of claim 12, wherein the apparatus is integrated with an access node to which the mobile device communicates; or the apparatus is instantiated at an edge of the communication network, or both.

20. The apparatus of claim 12, wherein associating the mobile device with the network slice includes one or more of: authenticating the mobile device; authenticating the network slice to the mobile device; confirming the mobile device is authorized to access the network slice; admitting the mobile device to the network slice; establishing signaling and data bearers for the mobile device; establishing network forwarding rules supporting the mobile device; performing a path computation operation using a flow manager entity in the communication network; performing a path configuration operation by the flow manager entity; and transmitting an attach response to the mobile device indicative that association of the mobile device with the network slice has been performed.

21. The apparatus of claim 12, wherein the identifier is provided to the mobile device via: a broadcast channel; a unicast message; a multicast message; or pre-programming in the mobile device.

22. The apparatus of claim 12, wherein the connection manager apparatus is instantiated in a management plane separate from the plurality of network slices.

* * * * *